(12) United States Patent
Van Derven et al.

(10) Patent No.: US 10,082,216 B1
(45) Date of Patent: Sep. 25, 2018

(54) ADAPTIVE VALVE CONTROL SYSTEM

(71) Applicant: Johnson Controls Technology Company, Plymouth, MI (US)

(72) Inventors: Nicholas S. Van Derven, Wauwatosa, WI (US); Kraig D. Ritmanich, Brookfield, WI (US); Peter J. Wawer, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/656,021

(22) Filed: Jul. 21, 2017

(51) Int. Cl.
| | |
|---|---|
| *H02P 8/00* | (2006.01) |
| *F16K 31/04* | (2006.01) |
| *H02P 8/12* | (2006.01) |
| *H02P 8/34* | (2006.01) |
| *F16K 37/00* | (2006.01) |

(52) U.S. Cl.
CPC .......... *F16K 31/04* (2013.01); *F16K 37/0041* (2013.01); *H02P 8/12* (2013.01); *H02P 8/34* (2013.01)

(58) Field of Classification Search
CPC ........ F16K 31/12; F16K 31/02; F16K 31/124; F16K 33/00; F16K 49/00; F16K 31/20; F16K 31/30; F16K 24/00; F16K 15/18; G05B 19/40; H02P 8/00; F25B 41/062

USPC .... 318/685, 696, 34, 400.01, 700, 727, 800, 318/490; 91/403, 457; 137/233, 309; 180/205.3, 206.2; 251/315.08, 21, 25, 28, 251/56, 59, 61, 58, 129.01, 188, 213, 251/289, 290, 291, 296, 318, 349; 62/204, 210, 222

See application file for complete search history.

(56) References Cited

U.S. PATENT DOCUMENTS

2015/0362236 A1* 12/2015 Jiang ..................... F25B 41/062
                                                                137/12

* cited by examiner

*Primary Examiner* — Antony M Paul
(74) *Attorney, Agent, or Firm* — Foley & Lardner LLP

(57) ABSTRACT

Disclosed is a system to dynamically operate a valve including a direct current (DC) stepper motor. The system includes a valve detector to identify the valve and to determine whether the valve is operable in multiple operating modes. The system further includes a mode selector electrically coupled to the valve detector. The mode selector selects an operating mode from the multiple operating modes. The system further includes a current selector electrically coupled to the mode selector. The current selector selects a target current level based on the selected operating mode. The system further includes a motor controller electrically coupled to the current selector and the DC stepper motor. The motor controller drives the DC stepper motor with a drive current at the selected target current level.

18 Claims, 22 Drawing Sheets

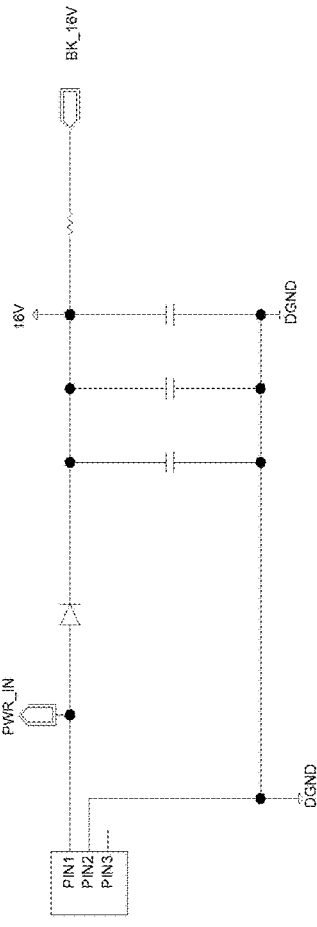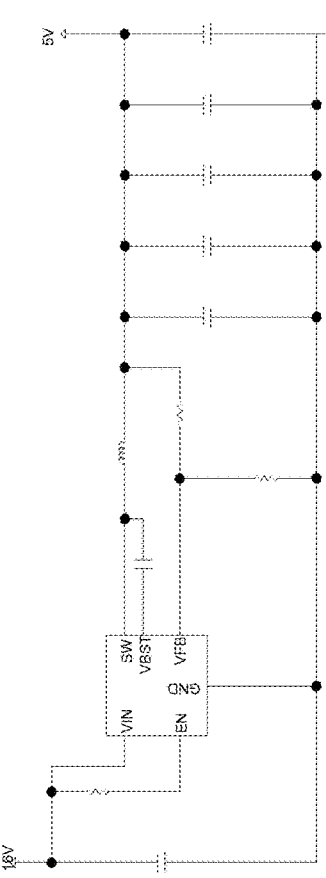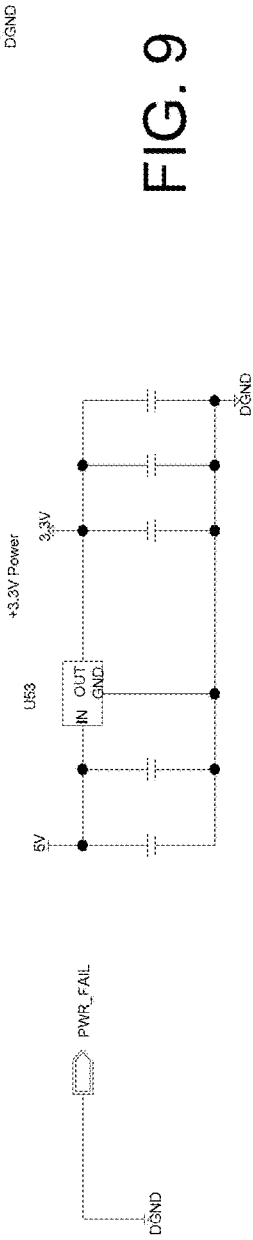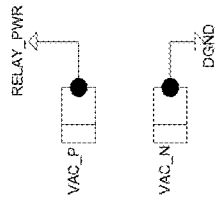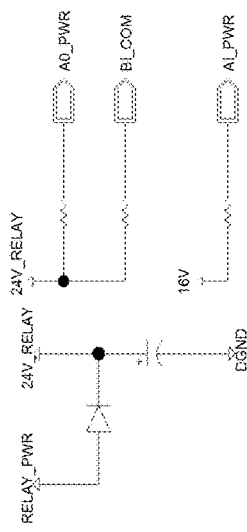
FIG. 9

FIG. 17 Analog Inputs 1-5

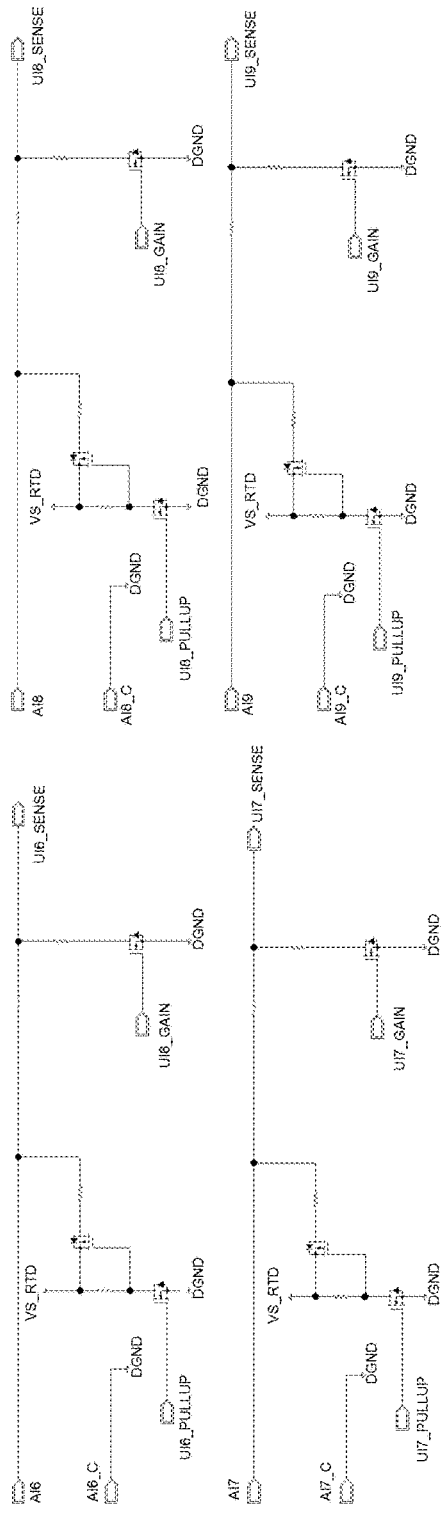
Analog Inputs 6-9
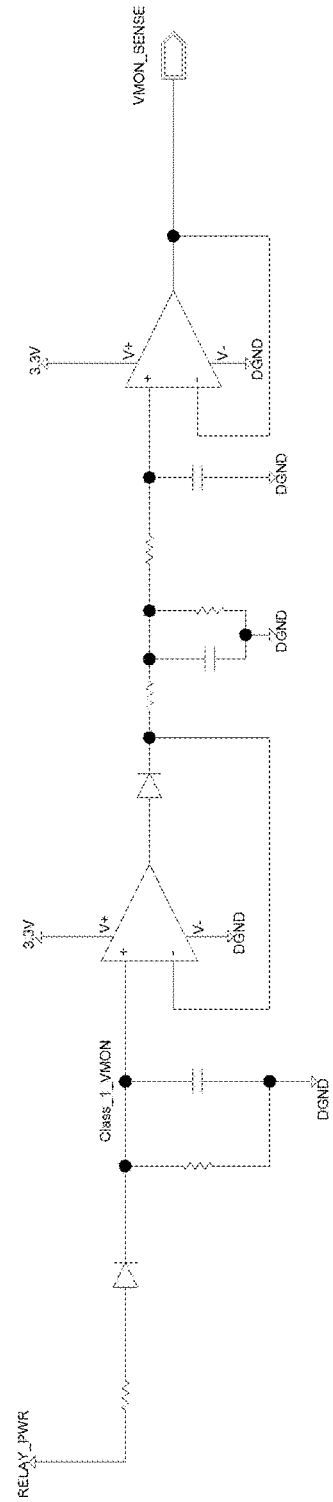
Voltage Monitor
FIG. 18

ADAPTIVE VALVE CONTROL SYSTEM

BACKGROUND

The present disclosure relates generally to control systems for a heating, venting, and air conditioning (HVAC) system. More particularly, the present disclosure relates to control systems for setting a drive current of a motor controlling a valve within the HVAC system.

In an HVAC system, a valve controls a flow of refrigerant entering a direct expansion evaporator. In one example, a controller controls an amount of opening (or closing) of the valve. Depending on the amount of opening of the valve, the flow of refrigerant can change.

In some HVAC systems, different types (e.g., determined based on models or manufactures) of valves may be implemented. For example, a certain valve may be suitable for handling a particular range of flow rate or pressure of the refrigerant, where another valve may be suitable for handling a different range of flow rate or pressure of the refrigerant. For another example, a dynamic valve can dynamically operate in different operating modes, where a static valve operates in a predetermined operating mode.

Such diversity in valves increases implementation and operation costs of HVAC systems. In particular, some valves may be operable with certain controllers, but may not be operable with other controllers. Accordingly, implementing HVAC systems involves identifying compatible controllers for different valves. In case a controller malfunctions, finding a substitute from a large number (e.g., hundreds and thousands) of controllers may be cumbersome and time consuming. Moreover, a valve operable in different operating modes including a first operating mode and a second operating mode may be forced to operate in the first operating mode with a power consumption higher than a power consumption of the valve operating in the second operating mode to accommodate a controller capable of driving the valve in the first operating mode but not the second operating mode. As a result, conventional HVAC systems may suffer from inefficient power usage.

SUMMARY

Various embodiments of the present disclosure relate to a system to operate a valve including a direct current (DC) stepper motor. The system includes a valve detector to identify the valve and determine whether the valve is operable in multiple operating modes. The system also includes a mode selector electrically coupled to the valve detector. The mode selector selects an operating mode from the multiple operating modes. Moreover, the system includes a current selector electrically coupled to the mode selector. The current selector selects a target current level based on the selected operating mode. Furthermore, the system includes a motor controller electrically coupled between the current selector and the DC stepper motor. The motor controller drives the DC stepper motor with a drive current at the selected target current level.

Various embodiments of the present disclosure relate to a system to operate a valve including a motor. The system includes a mode selector to select an operating mode from multiple operating modes based on characteristics of the valve. Moreover, the system includes a current selector electrically coupled to the mode selector. The current selector selects a target current level based on the selected operating mode. Furthermore, the system includes a motor controller electrically coupled between the current selector and the motor. The motor controller drives the motor with a drive current at the selected target current level.

Various embodiments of the present disclosure also relate to a method of operating a valve including a direct current (DC) stepper motor. The method includes identifying the valve and determining whether the valve is operable in multiple operating modes. The method further includes selecting an operating mode from the multiple operating modes. The method further includes selecting a target current level based at least partially on the selected operating mode. The method further includes driving the DC stepper motor at the selected target current level, thereby causing the DC stepper motor to operate in the selected operating mode.

BRIEF DESCRIPTION OF THE DRAWINGS

FIG. 9 shows an example schematic diagram of a power supply for supplying power to the processing circuit of FIG. 7 and the motor controller of FIG. 8, according to some embodiments.

FIG. 18 illustrates an example schematic diagram of an additional analog input interface coupled to the processing circuit of FIG. 7, according to some embodiments.

DETAILED DESCRIPTION

Overview

Referring generally to the FIGURES, systems and methods for dynamically controlling a valve in an HVAC system are described. More particularly, the systems and methods herein include a controller for dynamically controlling the valve according to different operating modes of the valve.

In some embodiments, the valve includes a valve port through which fluid (e.g., gas, liquid or both) can flow and a motor for controlling a configuration of the valve port. The valve port is mechanically closed or opened by the motor. Specifically, the motor controls an amount of opening or closing of the valve port, according to a drive current provided to the motor.

In some embodiments, the controller dynamically controls a drive current provided to the motor, depending on characteristics of the valve or an operating mode of the valve. For example, the controller determines one or more available operating modes of the valve, and selects an operating mode among the available operating modes. The operating mode may be selected in consideration of a power source, or any characteristics (e.g., power consumption, flow rate, pressure, response time, etc.) of the valve in operation. Moreover, the controller determines a target current level of the drive current corresponding to the selected operating mode, and configures the motor to operate at the selected target current level.

Beneficially, the disclosed controller provides several advantages. In one aspect, the controller can adaptively operate, thereby allowing ease of integration with different valves or other components. For example, in case a controller, a valve or both fail, any of these components can be easily replaced. In another aspect, the controller can achieve power optimization by driving the motor in an operating mode with a lower power consumption when applicable. For example, the valve can operate in one of a slow drive mode, a hold drive mode, and a fast drive mode, depending on a response time of the valve and power consumption. The controller may configure the valve to operate in the hold drive mode to conserve power, when the valve is on hold.

Building and HVAC System

Figure 1:
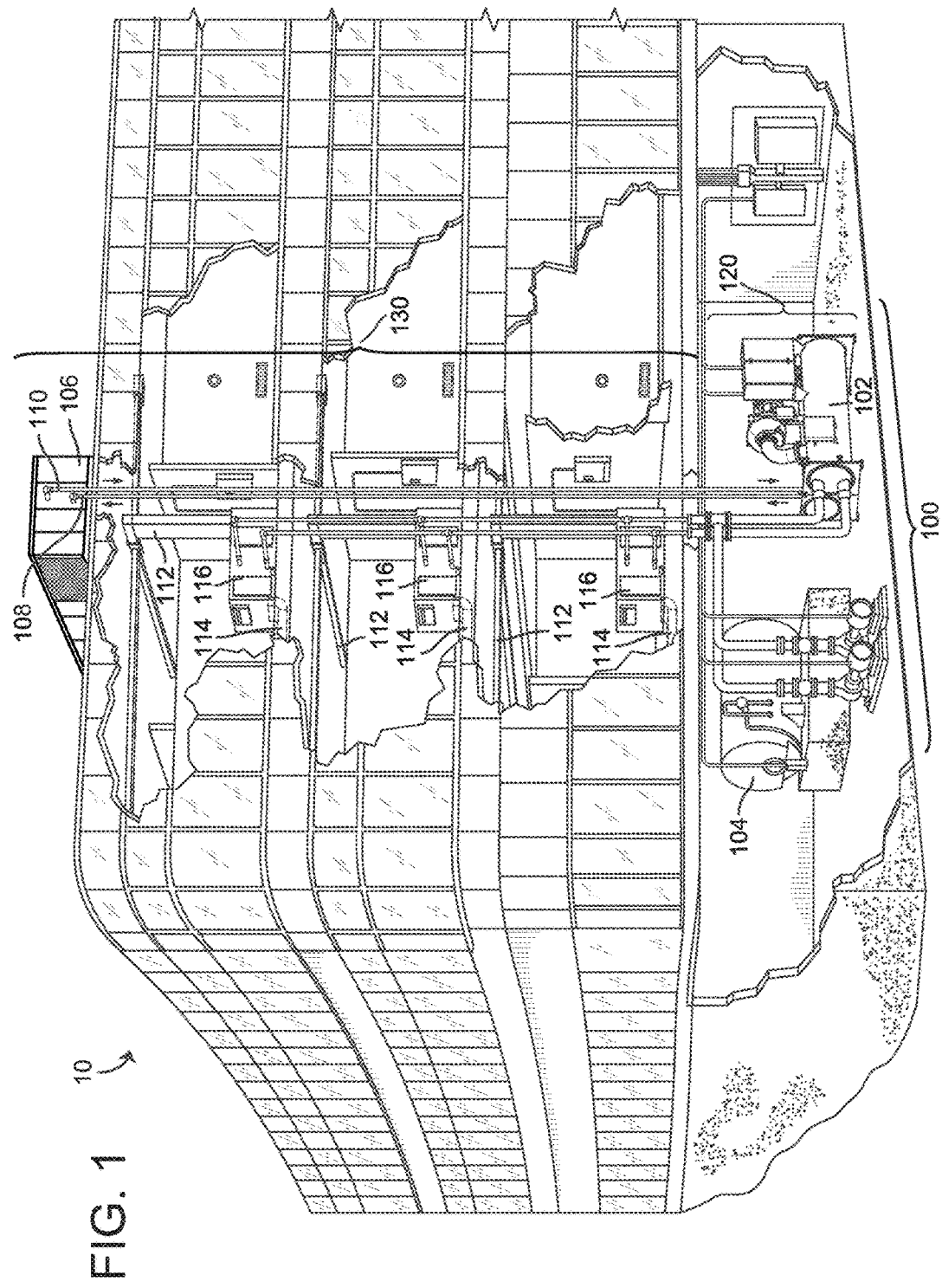
FIG. 1 is a drawing of a building equipped with an HVAC system, according to some embodiments.
Figure 2:
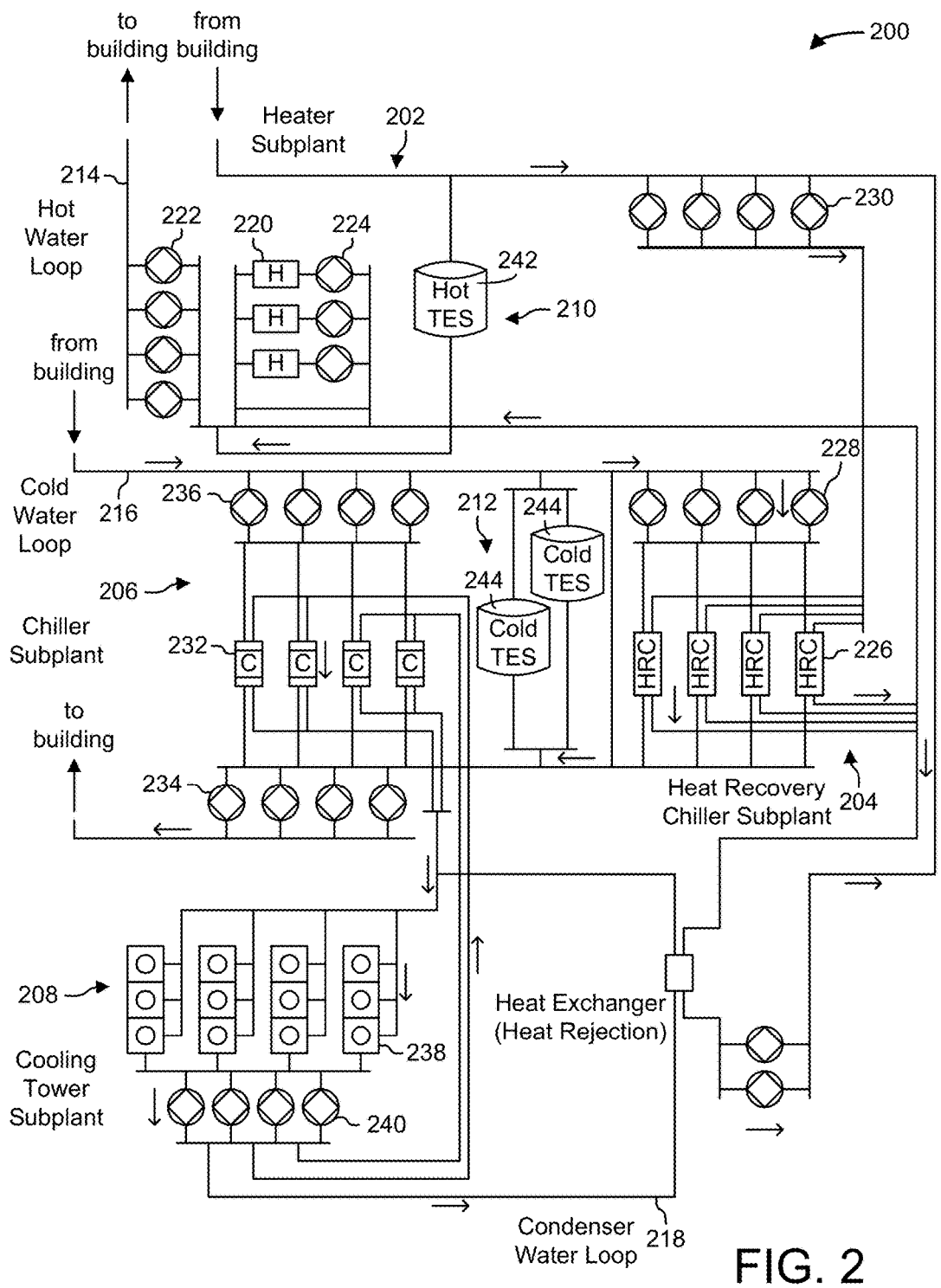
FIG. 2 is a schematic of a waterside system, which can be used as part of the HVAC system of FIG. 1, according to some embodiments.
Figure 3:
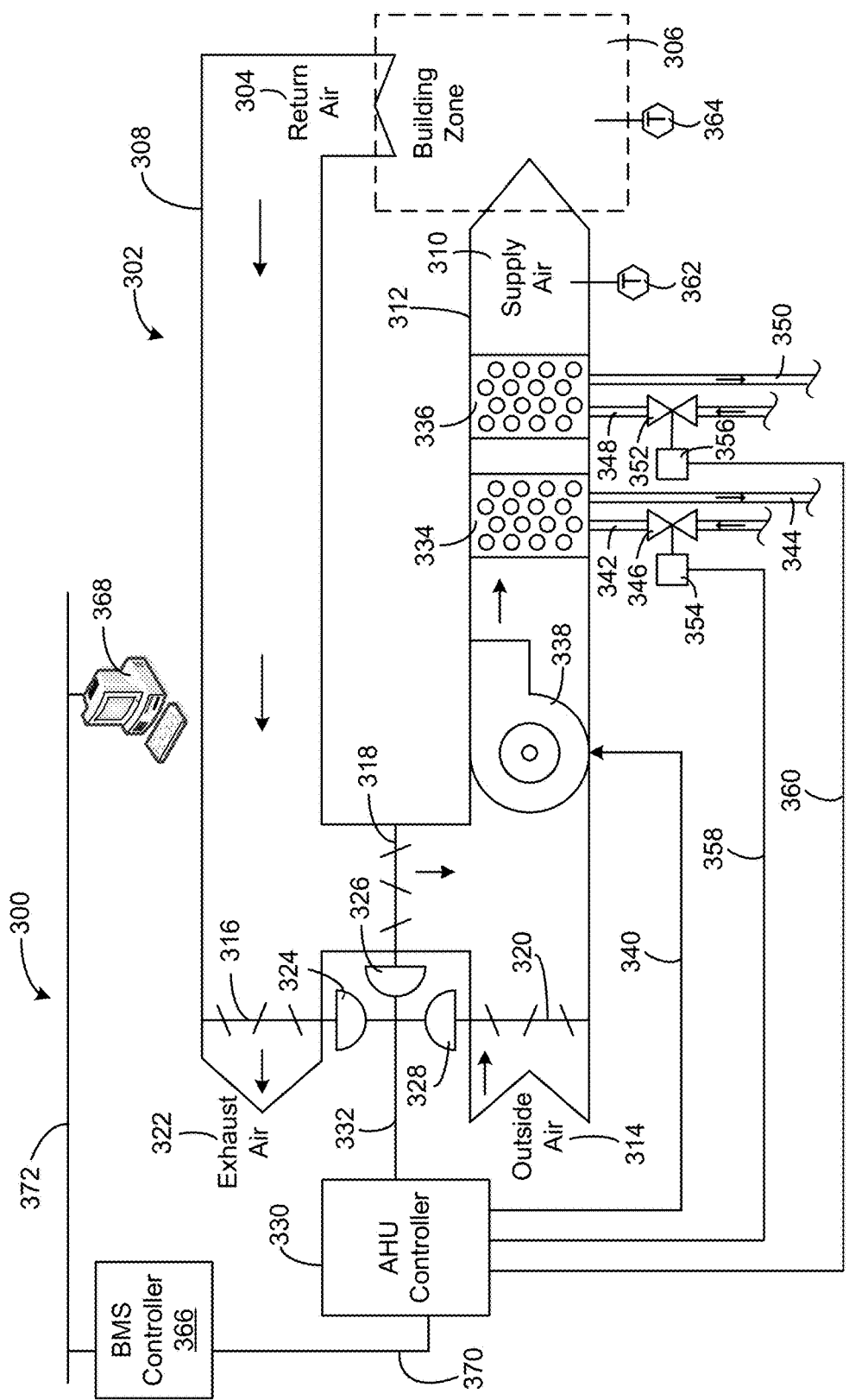
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. More particularly, the systems and methods described herein may be applicable for a valve of the HVAC system as described in FIGS. 1-3. While the systems and methods of the present disclosure are described primarily in the context of a building HVAC system, it should be understood that the control strategies described herein may be generally applicable to any type of control system that provides a current drive to a motor.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements.

AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, setpoints, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 can communicate with BMS controller 366 and/or AHU controller 330 via communications link 372.

Valve Control System

Figure 4:
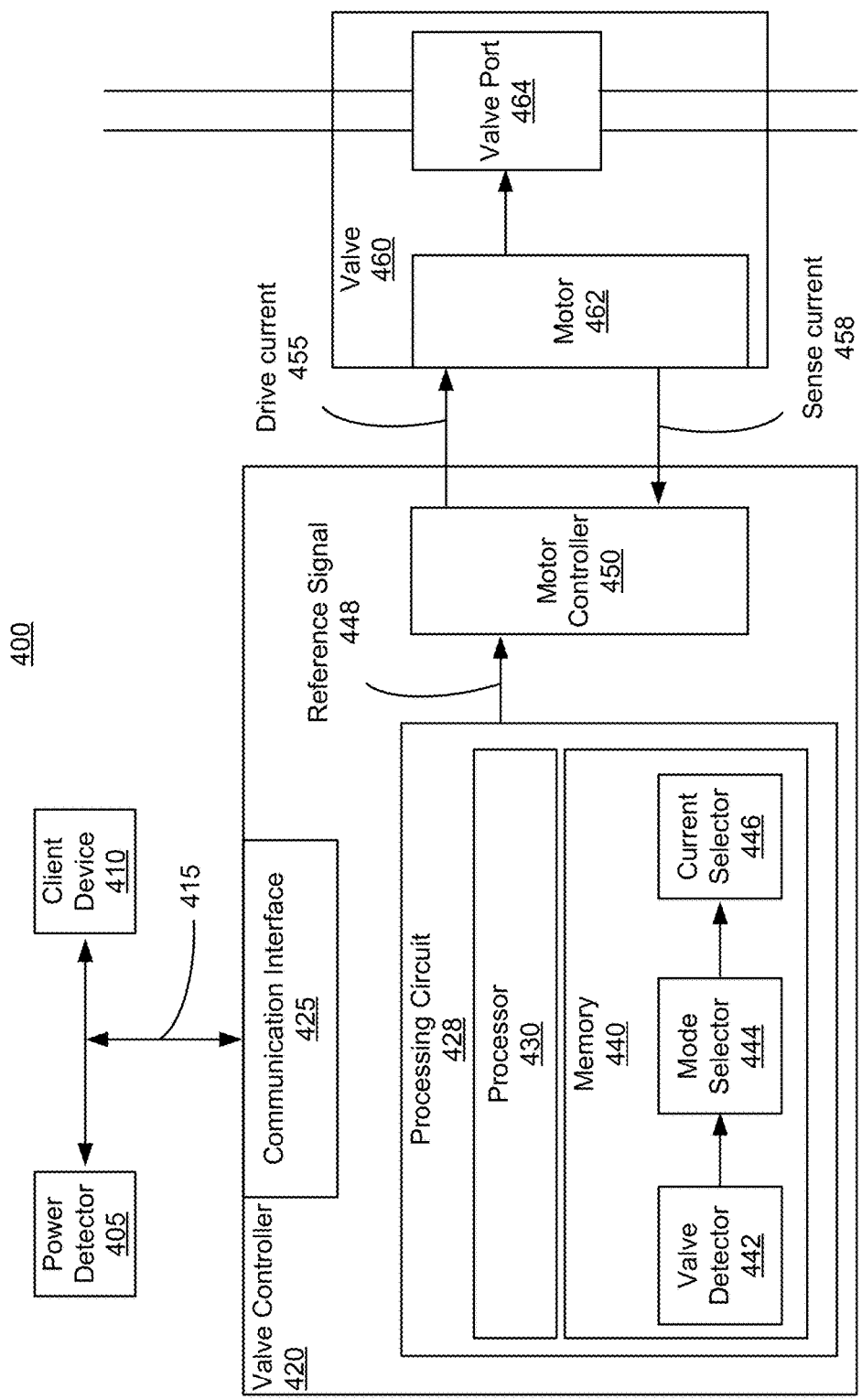
FIG. 4 is a block diagram of a valve control system, according to some embodiments.

FIG. 4 is a block diagram of a valve control system 400, according to one or more embodiments. In one embodiment, the valve control system 400 includes a power detector 405, a client device 410, a valve controller 420, and a valve 460. The valve controller 420 is communicatively coupled to the power detector 405 and the client device 410 through a network 415. In addition, the valve controller 420 is electrically coupled to the valve 460, and dynamically controls an operation of the valve 460. These components operate together to adaptively determine an operating mode of the valve 460 and control an amount of fluid passing through the valve 460 according to the determined operating mode.

The client device 410 is a computing machine that provides device characteristic information to the valve controller 420. The client device 410 may be the client device 368 of FIG. 3 storing the device characteristic information indicating characteristics or attributes of various components in the HVAC system 100. For example, device characteristic information of a valve indicates a device identification, a type, a model number, a manufacturer, a range of allowable flow rate, pressure, and temperature of fluid, operating modes, current levels for driving the valve in corresponding operating modes, etc. The client device 410 stores the device characteristic information at a storage component of the client device 410 or at an external database. The client device 410 may automatically crawl information and generate the device characteristic information based on the device identification number. Alternatively, a user may enter the device characteristic information through a user interface. The client device 410 may receive a request for device characteristic information of a particular component (e.g., valve) associated with a device identification, retrieve the device characteristic information, and provide the retrieved device characteristic information, for example in a look up table format, to the valve controller 420 through the network 415.

The power detector 405 is a component that detects a power status of the HVAC system 100 or any components of the HVAC system 100, and generates power status information indicating the detected status. The power detector 405 may be embodied as a hardware, a software, a firmware, or a combination thereof. The power detector 405 may be a software module executed by the AHU controller 330 of FIG. 3. In one aspect, the power detector 405 detects whether the HVAC system 100 or a component (e.g., valve 460) of the HVAC system 100 is operating with a backup power source or not, and generates power status information indicating the detected status. The power detector 405 provides the power status information to the valve controller 420 through the network 415.

The valve 460 is a hardware component that receives a drive current 455 from the valve controller 420, and controls a flow rate of fluid passing through according to the drive current 455. The valve 460 may be any of the valves 346, 352 of FIG. 3. In some embodiments, the valve 460 is operable in different operating modes according to the drive current 455. Examples of the operating modes include a slow drive mode, a hold drive mode, and a fast drive mode. In the fast drive mode, the valve 460 responds faster than the valve 460 operating in the hold drive mode and the slow drive mode. However, the valve 460 consumes higher power in the fast drive mode than the valve 460 operating in the hold drive mode and the slow drive mode. In the slow drive mode, the valve 460 responds slower in the slow drive mode than the valve 460 operating in the fast drive mode, but consumes less power than the valve 460 operating in the fast drive mode. In the hold drive mode, the valve 460 is on hold, and consumes less power than the valve 460 operating in the slow drive mode and the fast drive mode.

In one configuration, the valve 460 includes a motor 462 and a valve port 464. The motor 462 receives the drive current 455, and controls an amount of opening (or closing) of the valve port 464 according to the drive current 455. According to the opening or the closing of the valve port 464, a flow rate of fluid through the valve 460 can be controlled. In addition, the motor 462 generates a sense current indicating a sense current level corresponding to an amount of current consumed by the motor 462, and provides the sense current 458 to the valve controller 420. In one implementation, the valve 460 is an electronic expansion valve (EEV), and the motor 462 is a direct current (DC) stepper motor. A DC stepper motor does not rotate continuously, but instead rotates a fraction of a revolution for each signal transmitted from the valve controller 420, thereby allowing an accurate control of the opening (or closing) of the valve port 464. In other implementations, other types of valves may be employed.

The valve controller 420 is a hardware component that provides the drive current 455 to the valve 460. The valve controller 420 may be the AHU controller 330 of FIG. 3 or a combination of the BMS controller 366 and the AHU controller 330 of FIG. 3. In one configuration, the valve controller 420 includes a communication interface 425, a processing circuit 428, and a motor controller 450. These components operate together to determine an operating mode, for example, based on the device characteristic information and the power status information, and supply the drive current corresponding to the operating mode to the valve 460. In some embodiments, the valve controller 420 includes additional, fewer, or different components than shown in FIG. 4.

The communication interface 425 facilitates communication among the valve controller 420, the power detector 405, and the client device 410. The communication interface 425 can be or include wired or wireless communications interfaces (e.g., jacks, antennas, transmitters, receivers, transceivers, wire terminals, etc.) for conducting data communications with the valve controller 420, the power detector 405, and the client device 410, or other external devices. In various embodiments, communications via the communication interface 425 can be direct (e.g., local wired or wireless communications) or via a communications network (e.g., a WAN, the Internet, a cellular network, etc.). For example, the communication interface 425 can include an Ethernet/USB/RS232/RS485 card and port for sending and receiving data through the network 415. In another example, the communication interface 425 can include a Wi-Fi transceiver for communicating via a wireless communications network. In another example, the communication interface 425 can include cellular or mobile phone communications transceivers.

The processing circuit 428 is a hardware circuit that determines an operating mode of the valve 460, and selects a target current level of the drive current 455 for generating a reference signal 448 according to the determined operating mode. A reference signal 448 is an electric signal (e.g., voltage or current) indicating a target current level of the drive current 455. In one embodiment, the processing circuit 428 includes a processor 430, and memory 440 storing instructions (or program code) executable by the processor 430. In one embodiment, the instructions executed by the processor 430 form software modules including a valve detector 442, a mode selector 444, and a current selector 446. In other embodiments, the processor 430, and the memory 440 may be omitted, and the valve detector 442, the mode selector 444, and the current selector 446 may be implemented as hardware modules by a reconfigurable circuit (e.g., field programmable gate array (FPGA)), an application specific integrated circuit (ASIC), or any circuitries for performing functions of the modules. In some embodiments, the valve detector 442, the mode selector 444, and the current selector 446 may be implemented as a combination of software modules and hardware modules.

The valve detector 442 identifies the valve 460, and obtains characteristics of the valve 460. Example characteristics of the valve 460 include operating modes supported by the valve 460, a flow rate, temperature, pressure of fluids, etc. The valve detector 442 may receive device characteristic information of a plurality of components from the client device 410, and store the device characteristic information in a look up table format. The valve detector 442 may automatically obtain an identification of the valve 460 from the valve 460 or through a user input. Moreover, the valve detector 442 identifies available operating modes supported by the valve 460, for example, through the look up table based on the identification of the valve 460.

The mode selector 444 selects an operating mode from a plurality of operating modes supported by the valve 460. In one approach, the mode selector 444 selects the operating mode based on the device characteristic information. In particular, the mode selector 444 may determine an operating mode based on flow rate, pressure, temperature, etc. of fluid passing through the valve 460 and power consumption associated with the operating mode. For example, the mode selector 444 determines from operating modes including a slow drive mode, a hold drive mode, a fast drive mode, the hold drive mode to be an operating mode, because a configuration of the valve may be fixed and the hold drive mode consumes the least power. The mode selector 444 may further determine an operating mode based on the power status information. For example, the mode selector 444 determines a slow drive mode to be an operating mode, because the power status information indicates that the HVAC system 100 or the valve 460 is powered by a backup power supply. Detailed process of determining an operating mode is described below with respect to FIG. 6.

According to the operating mode selected, the current selector 446 selects a target current level of a drive current to be supplied to the motor 462. In one example, from the device characteristic information including a look up table indicating a plurality of operating modes supported by the valve 460 and corresponding current levels, the current selector 446 selects a target current level corresponding to the operating mode selected by the mode selector 444. Based on the target current level, a reference signal 448 can be generated and provided to the motor controller 450 for generating the drive current 455 at the target current level and operating the valve 460 at the selected operating mode.

The motor controller 450 is a hardware component that receives the reference signal 448 indicating a target current level of the drive current, and supplies the drive current 455 to the motor 462 accordingly. The motor controller 450 also receives the sense current 458 from the valve 460 as a feedback, and generates the drive current 455 according to the sense current 458 for improved control of the valve 460. In one aspect, the motor controller 450 compares the target current level indicated by the reference signal and the sense current level indicated by the sense current 458, and adjusts the drive current according to the comparison. For example, if the amount of current consumed is larger than the target current level, the motor controller 450 reduces a current level of the drive current 455 supplied to the motor 462. Conversely, if the amount of current consumed is less than the target current level, the motor controller 450 increases the current level of the drive current 455 supplied to the motor 462. Generating the drive current 455 based on the sense current 458 improves accuracy of control of the motor 462.

Although the valve controller 420 of FIG. 4 includes the communication interface 425, the processing circuit 428, and the motor controller 450, in other embodiments, the valve controller 420 may include different, fewer, or additional components than shown in FIG. 4. For example, the motor controller 450 may be integrated with the processing circuit 428 as a single component, or may be physically separated from the valve controller 420.

Figure 5:
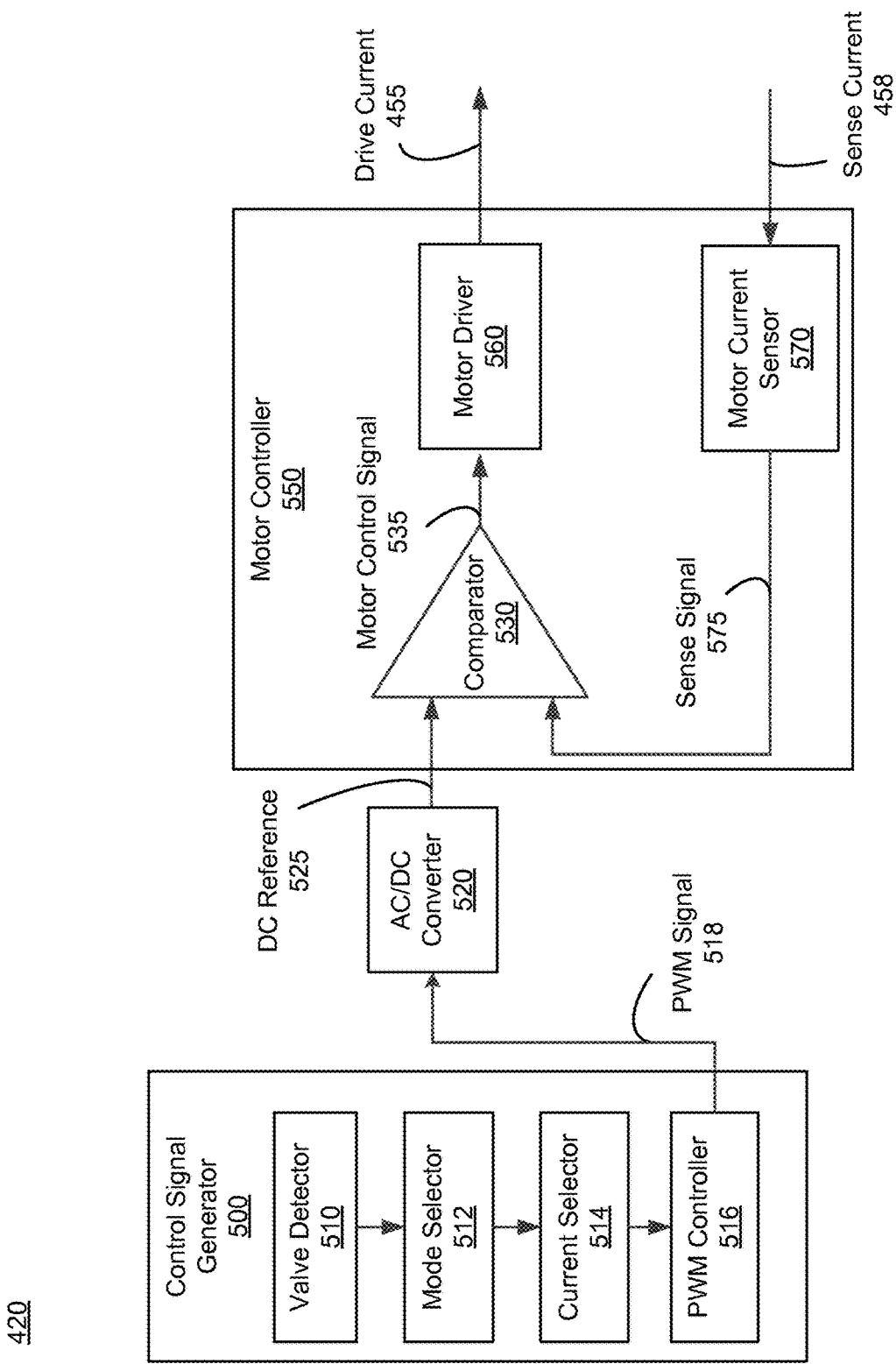
FIG. 5 is a block diagram of a valve controller dynamically controlling a valve, according to some embodiments.

FIG. 5 is a block diagram of a valve controller 420 dynamically controlling a valve, according to some embodiments. In the embodiment shown in FIG. 5, the valve controller 420 includes a control signal generator 500, an AC/DC converter 520, and a motor controller 550. These components operate together to supply the drive current 455 to a motor (e.g., motor 462 of FIG. 4) for operating a valve (e.g., valve 460 of FIG. 4).

The control signal generator 500 is a hardware component that determines a target current level of the drive current 455, and generates a pulse width modulated (PWM) signal 518 according to the determined current level. In one embodiment, the control signal generator 500 includes a valve detector 510, a mode selector 512, a current selector 514, and a PWM controller 516. The valve detector 510, the mode selector 512, and the current selector 514 may be embodied as the valve detector 442, the mode selector 444, and the current selector 446 of FIG. 4, respectively. Thus, detailed description thereof is omitted herein for sake of brevity.

The PWM controller 516 is a hardware component that generates the PWM signal 518 based on a target current level selected by the current selector 514. The PWM controller 516 may be embodied as part of the processing circuit 428 of FIG. 4 or a separate component from the processing circuit 428. In one aspect, the PWM controller 516 obtains a target current level selected by the current selector 514, and determines a pulse width of the PWM signal 518 according to the determined pulse width. Moreover, the PWM controller 516 generates the PWM signal 518 according to the determined pulse width, and provides the PWM signal 518 to the AC/DC converter 520.

The AC/DC converter 520 is a circuit component that receives the PWM signal 518 and generates a DC reference 525 according to the PWM signal 518. In one embodiment, the AC/DC converter 520 includes an input electrically coupled to an output of the PWM controller 516 to receive the PWM signal 518, and an output electrically coupled to an input of the motor controller 550 to output the DC reference 525, for example, through conductive wires or traces. The AC/DC converter 520 may be implemented as a filter (e.g., low pass filter) that converts an AC component of the PWM signal 518 into a DC voltage according to a pulse width of the PWM signal 518. Hence, the DC voltage of the DC reference 525 indicates a target current level selected by the current selector 514.

The motor controller 550 is a hardware component that receives the DC reference 525 indicating the target current level and a sensed current level of the sense current 458, and generates the drive current 455 for driving a motor. In one embodiment, the motor controller 550 includes a first input electrically coupled to an output of the AC/DC converter 520 to receive the DC reference 525, a second input electrically coupled to the motor (e.g., motor 462) to receive the sense current 458, and an output electrically coupled to the motor. In one configuration, the motor controller 550 includes a comparator 530, a motor driver 560, and a motor current sensor 570. These components operate together to generate the drive current 455 based on the DC reference 525 and the sense current 458. In other embodiments, the motor controller 550 includes additional, fewer or different components than shown in FIG. 5.

The motor current sensor 570 is a hardware component that receives the sense current 458 from the motor, and generates a sense signal 575 according to the sense current 458. In one embodiment, the motor current sensor 570 includes an input electrically coupled to the motor 462 (of the valve 460), and an output electrically coupled to an input of the comparator 530, for example, through conductive wires or traces. The motor current sensor 570 may convert the sense current 458 indicating the sensed current level into a corresponding voltage to generate the sense signal 575. Hence, the sense signal 575 indicates the sensed current level corresponding to a current level consumed by the motor 462. The motor current sensor 570 provides the sense signal 575 to the comparator 530.

The comparator 530 is a hardware component that receives the DC reference 525 and the sense signal 575, and generates a motor control signal 535 according to the DC reference 525 and the sense signal 575. In one embodiment, the comparator 530 includes a first input electrically coupled to an output of the AC/DC converter 520, a second input electrically coupled to an output of the motor current sensor 570, and an output electrically coupled to an input of the motor driver 560. In this configuration, the comparator 530 compares the DC reference 525 indicating the target current level and the sense signal 575 indicating the sensed current level, and generates the motor control signal 535 according to the comparison. In one aspect, the motor control signal 535 represents an error or an amount of difference of the sense signal 575 from the DC reference 525. The comparator 530 provides the motor control signal 535 to the motor driver 560.

The motor driver 560 is a hardware component that receives the motor control signal 535 and generates the drive current 455 according to the motor control signal 535. In one embodiment, the motor driver 560 includes an input electrically to the comparator 530 and an output electrically coupled to the motor 462, for example, through conductive wires or traces. Based on the motor control signal 535, the motor driver 560 generates the drive current 455, and supplies the drive current (e.g., DC current) to the motor 462. For example, if a voltage level of the DC reference 525 is larger than a voltage level of the sense signal 575, the motor control signal 535 output from the comparator 530 causes the motor driver 560 to increase a current level of the drive current 455. Conversely, if a voltage level of the DC reference 525 is less than a voltage level of the sense signal 575, the motor control signal 535 output from the comparator 530 causes the motor driver 560 to reduce a current level of the drive current 455. Employing a negative feedback as shown in FIG. 5 allows accurate control of the drive current 455 to the motor.

Figure 6:
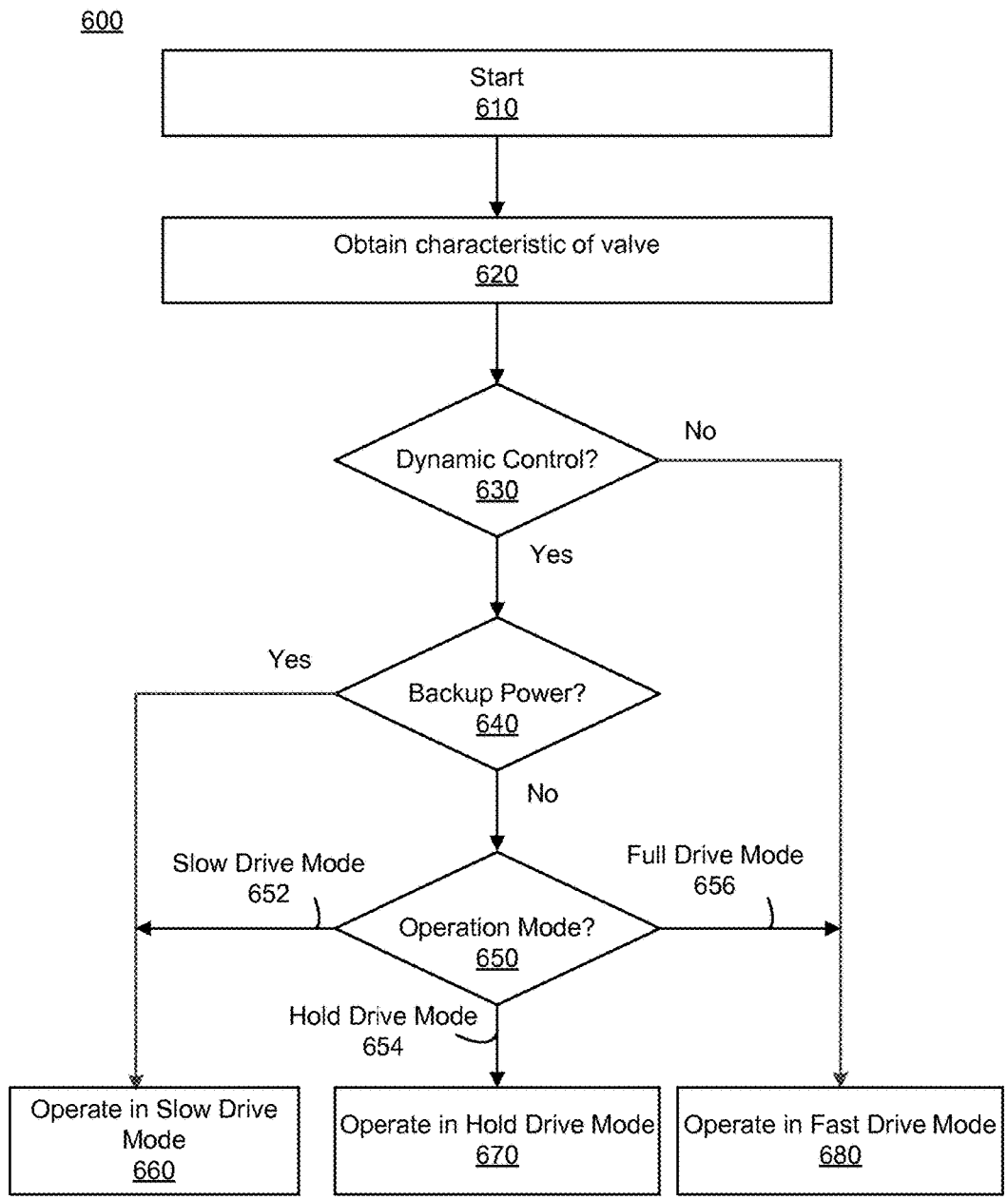
FIG. 6 is a flow chart illustrating a process for dynamically controlling a valve, according to some embodiments.

FIG. 6 is a flow chart illustrating a process 600 for dynamically controlling a valve 460, according to some embodiments. The process 600 may be performed by the valve controller 420 of FIG. 4. In some embodiments, the process 600 may be performed by other entities. In some embodiments, the process 600 may include additional, fewer, or different steps than shown in FIG. 6.

The valve controller 420 starts the process 600 of controlling a valve coupled to the valve controller 420 (step 610) and obtains characteristics of the valve 460 (step 620). Step 620 may include identifying the valve (e.g., by model number, by valve type, by manufacturer, etc.) and accessing a database or other data source to obtain characteristics of the identified valve. Examples of the characteristics of the valve 460 include available operating modes supported by the valve 460, power consumption, etc. The valve controller 420 may obtain the characteristics of the valve 460 from the client device 410 or other computing device (e.g., an external computing device, an internal database, a remote server, a BMS controller, the valve 460 itself, etc.).

The valve controller 420 determines whether the valve 460 supports a dynamic control mechanism (step 630). In one approach, the valve controller 420 determines whether the valve 460 is operable with different operating modes (e.g., slow drive mode, hold drive mode, and fast drive mode). In response to determining that the valve 460 does not support the dynamic control mechanism (i.e., not operable with different operating modes), the valve controller 420 selects the fast drive mode, and selects a target current level corresponding to the fast drive mode. Moreover, the valve controller 420 operates the valve 460 in the fast drive mode (step 680) by supplying a drive current at the target current level to a motor of the valve 460.

In response to determining that the valve 460 supports the dynamic control mechanism (i.e., operable with different operating modes), the valve controller 420 determines whether the HVAC system 100 or the valve 460 operates based on a backup power source (step 640). In response to determining that the HVAC system 100 or the valve 460 operates based on the backup power source, the valve controller 420 selects the slow drive mode, and selects a target current level corresponding to the slow drive mode. Moreover, the valve controller 420 operates the valve 460 in the slow drive mode (step 660) by supplying a drive current at the target current level to a motor of the valve 460. Operating in the slow drive mode while receiving power from the backup power source can help reduce power consumption of the valve controller 420 and the valve 460.

In response to determining that the valve 460 operates by a main power source rather than the backup power source, the valve controller 420 selects an operating mode from a plurality of operating modes (step 650). The valve controller 420 may select the operating mode in consideration of the flow rate, response time, power consumption, etc. For example, the valve controller 420 selects the slow drive mode 652 as the operating mode, because a response time of the valve is can be slower than a response time of the valve operating the fast drive mode. For another example, the valve controller 420 selects the hold drive mode 654 as the operating mode, because the valve 460 is on hold status. For another example, the valve controller 420 selects the full drive mode 656 as the operating mode, because a fast response time of the valve 460 is needed. The valve controller 420 operates the valve 460 in the selected operating mode by selecting a target current level according to the selected operating mode, and supplying the drive current at the target current level to the motor of the valve 460.

Figure 7:
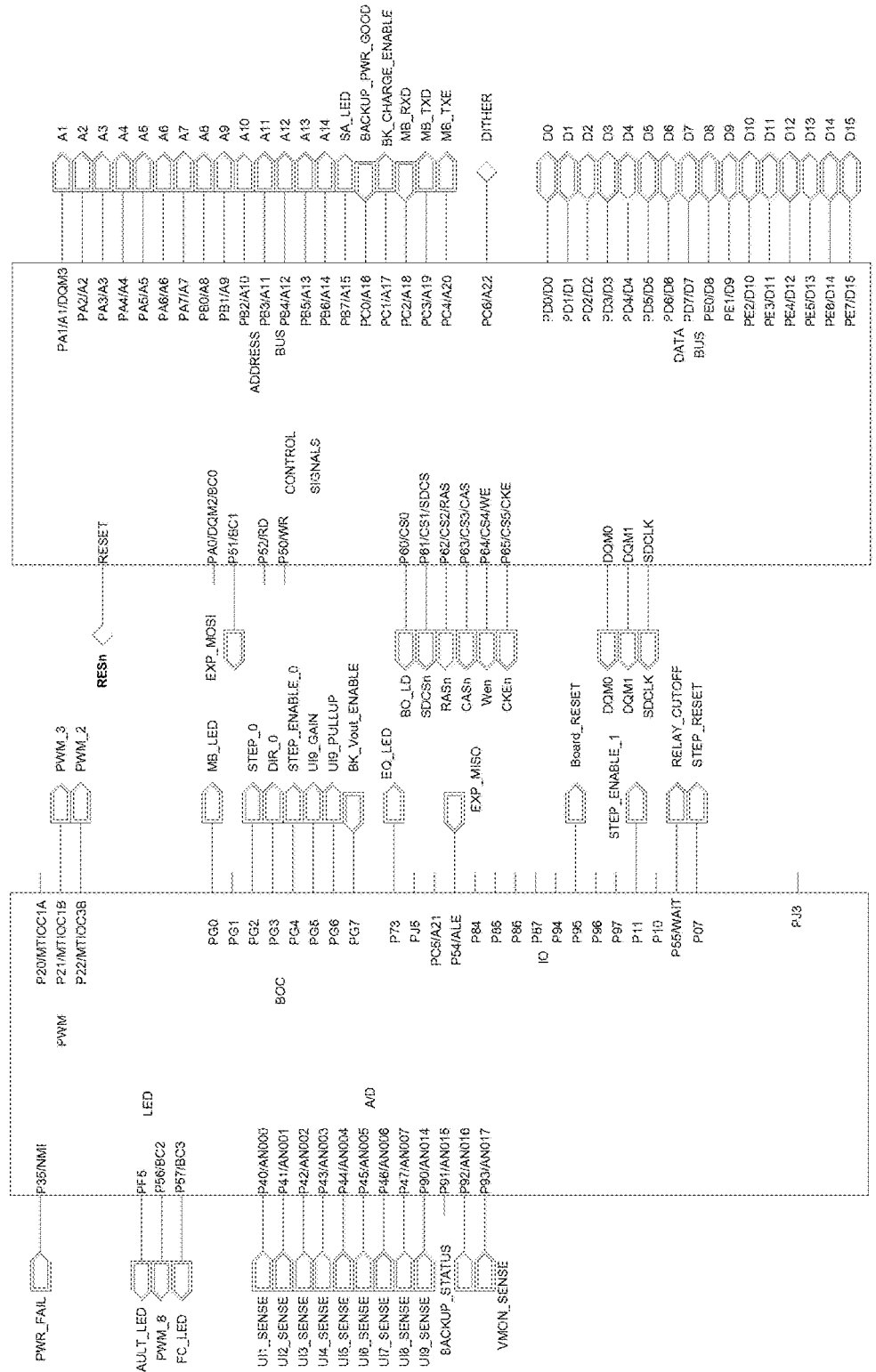
FIG. 7 shows an example schematic diagram of a processing circuit of FIG. 4, according to some embodiments.
Figure 8:
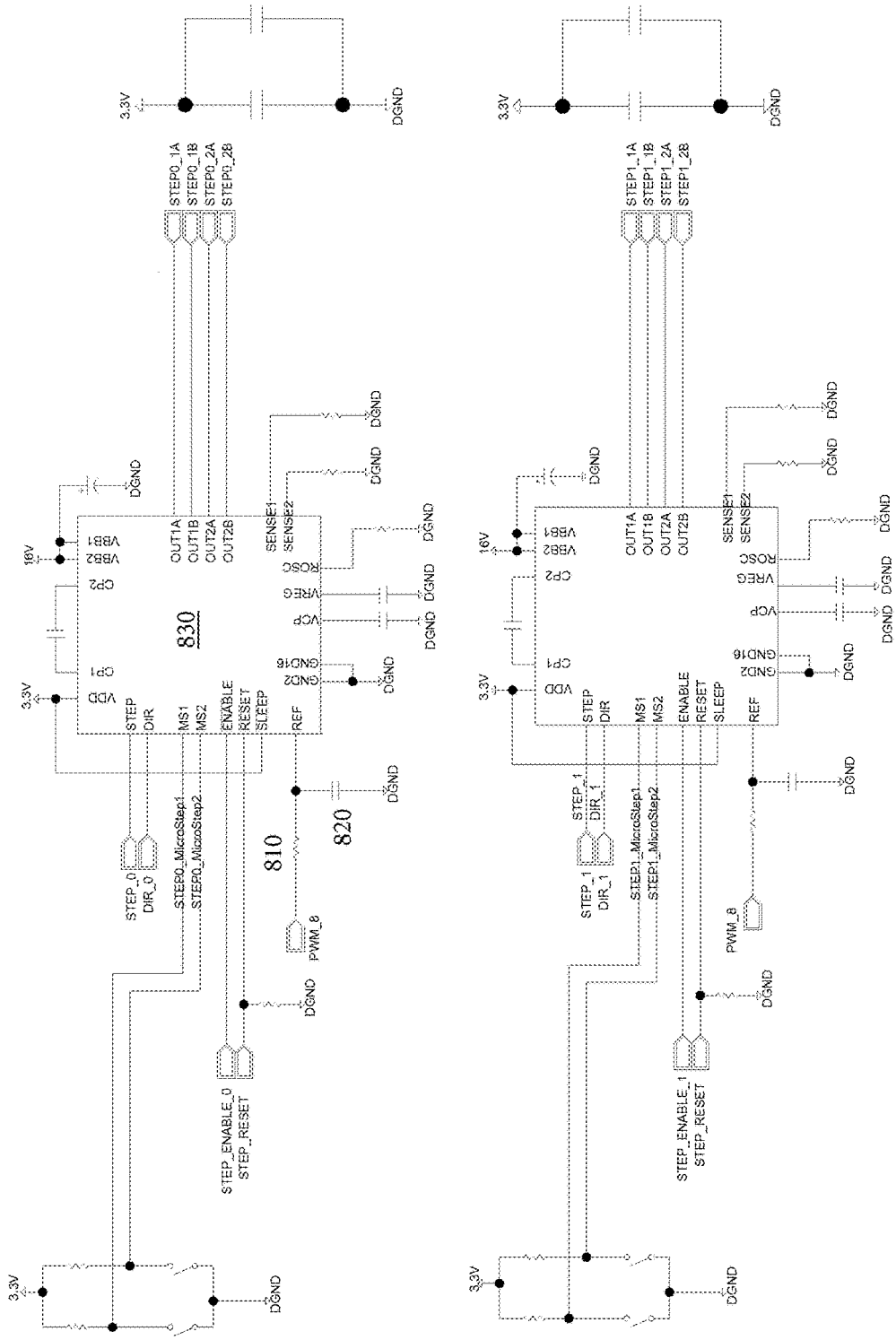
FIG. 8 shows an example schematic diagram of the motor controller of FIG. 4, according to some embodiments.
Figure 10:
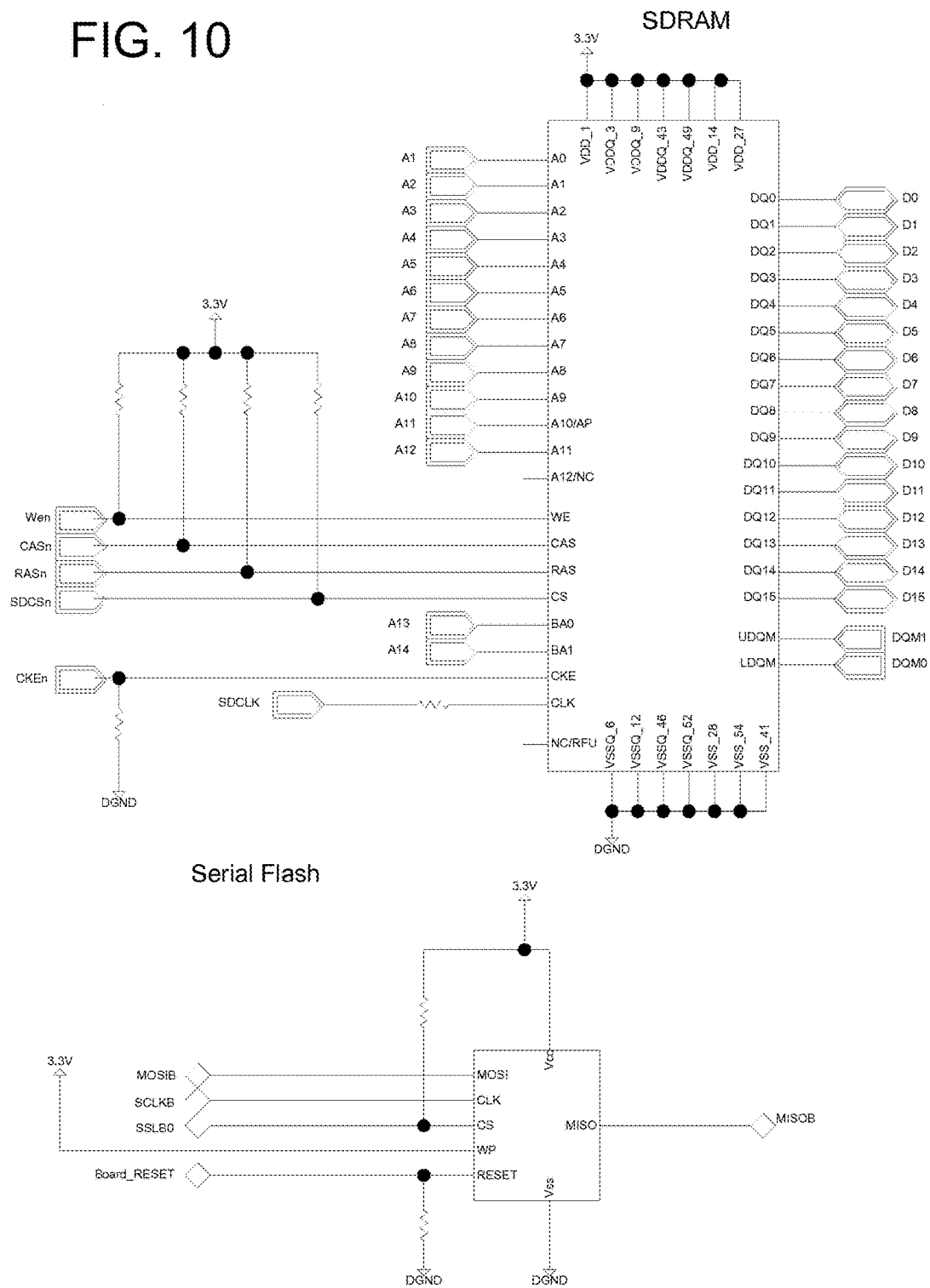
FIG. 10 shows an example schematic diagram of storage components coupled to the processing circuit of FIG. 7, according to some embodiments.
Figure 11:
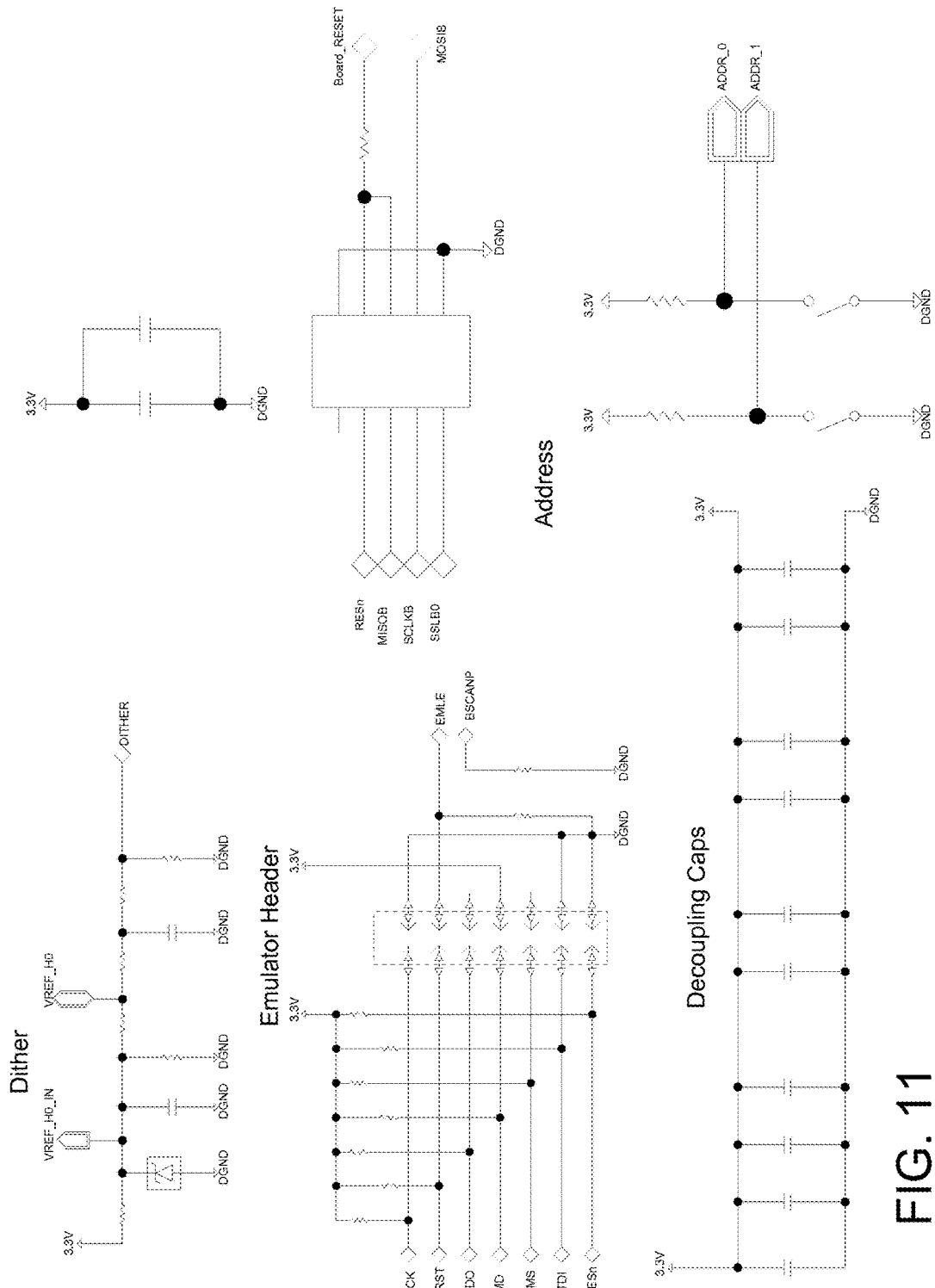
FIG. 11 shows an example schematic diagram of peripheral components coupled to the processing circuit of FIG. 7, according to some embodiments.
Figure 12:
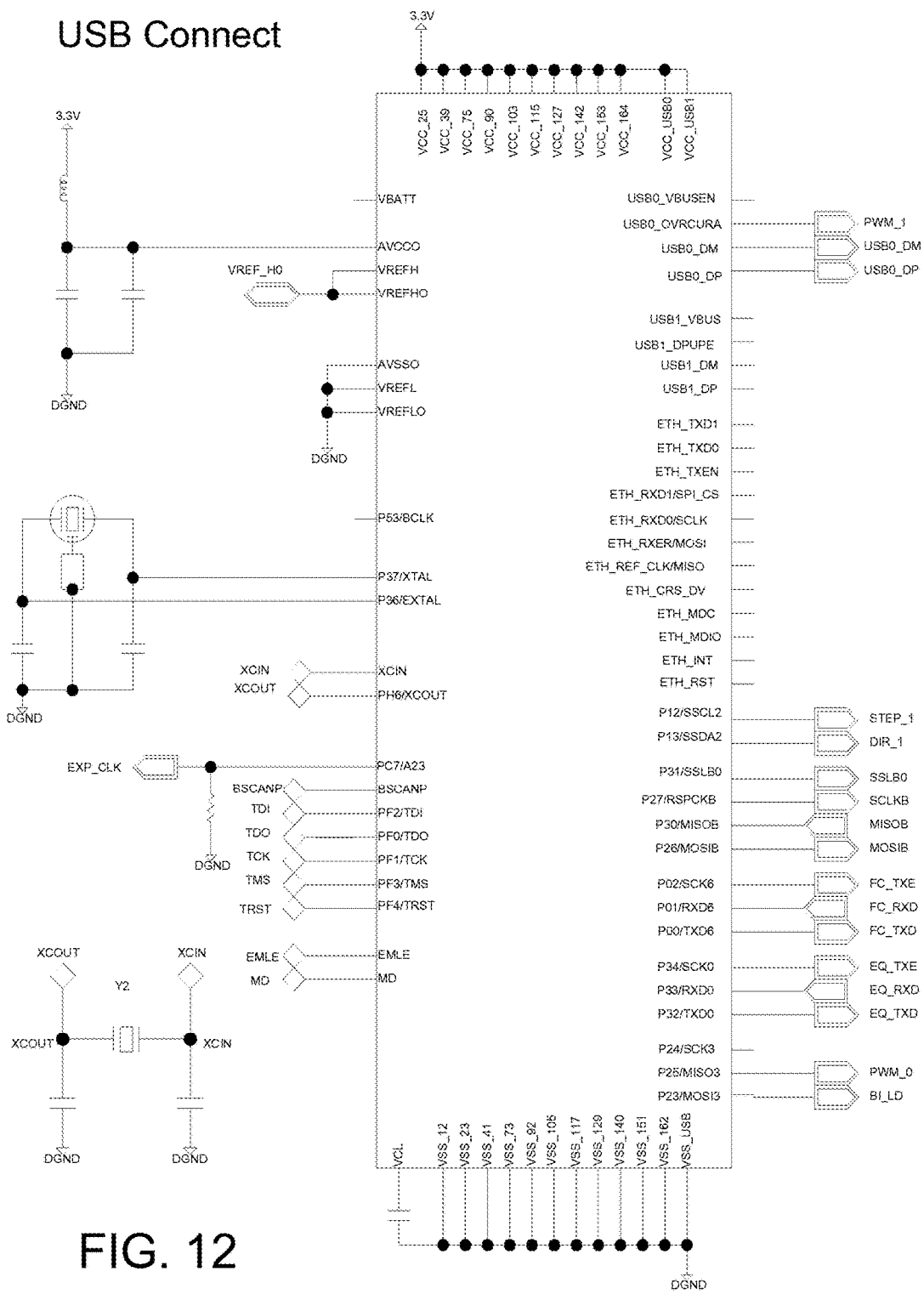
FIG. 12 illustrates an example schematic diagram of a USB interface coupled to the processing circuit of FIG. 7, according to some embodiments.
Figure 13:
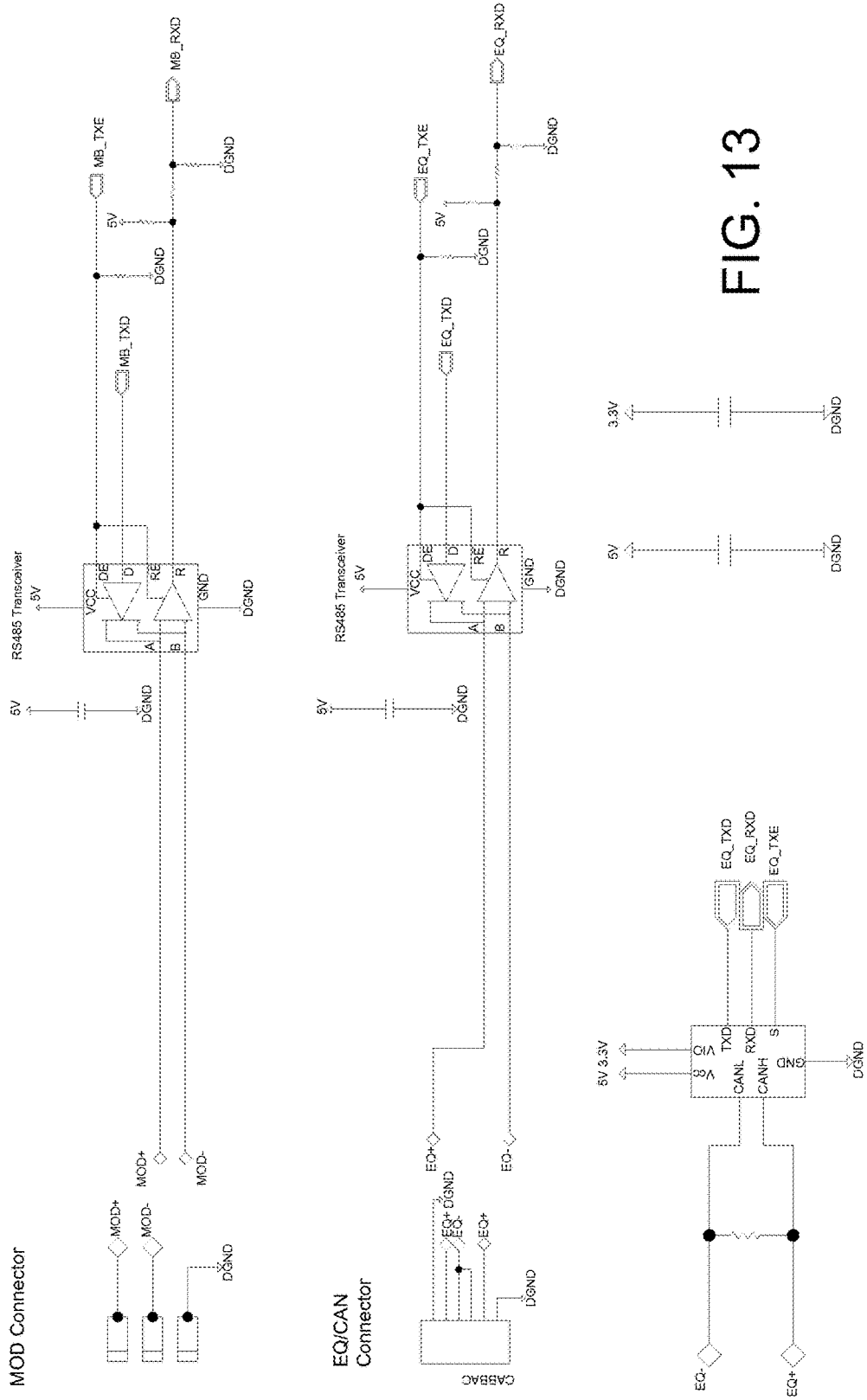
FIG. 13 illustrates an example schematic diagram of a communication interface coupled to the processing circuit of FIG. 7, according to some embodiments.
Figure 14:
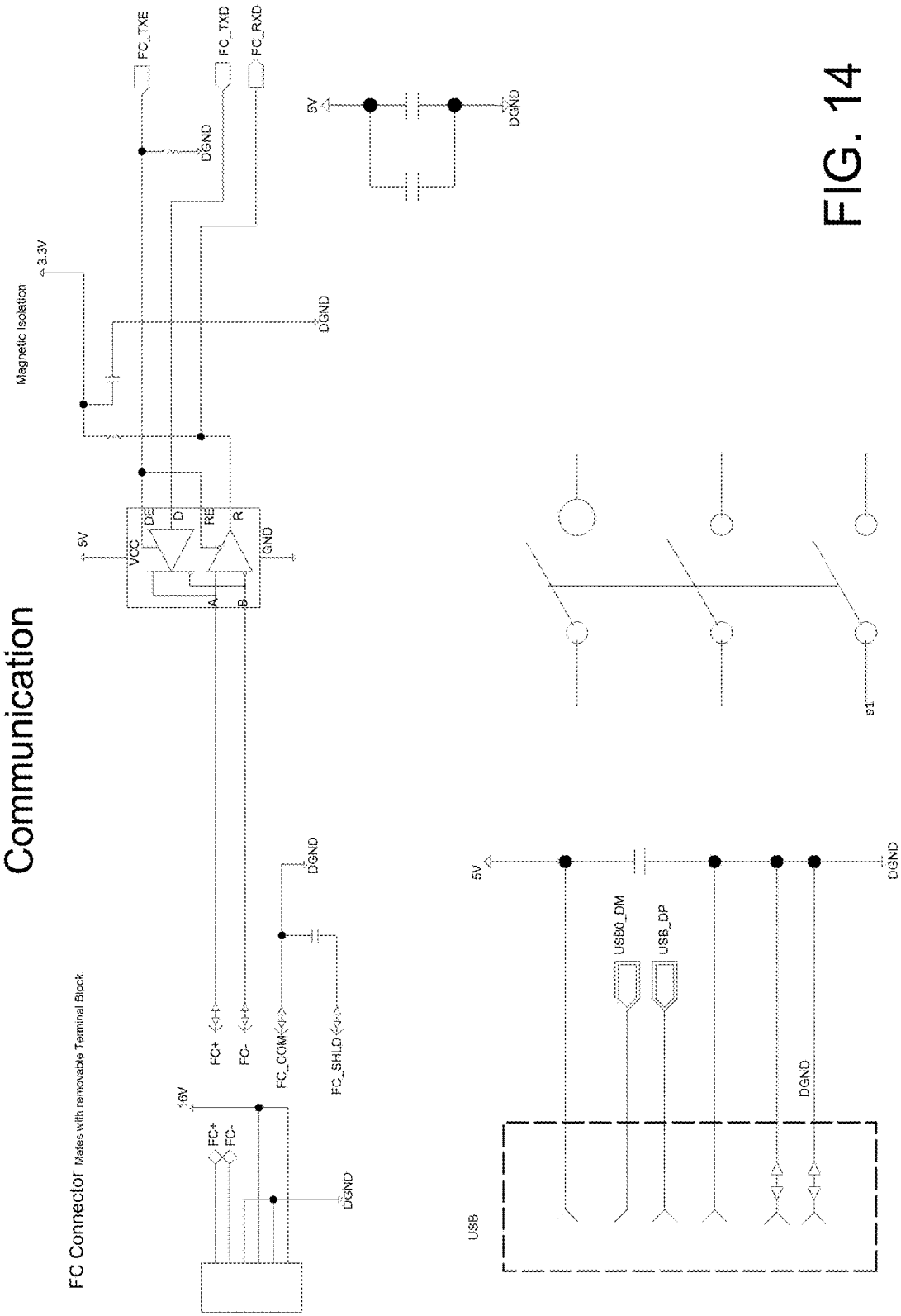
FIG. 14 illustrates an example schematic diagram of another communication interface coupled to the processing circuit of FIG. 7, according to some embodiments.
Figure 15:
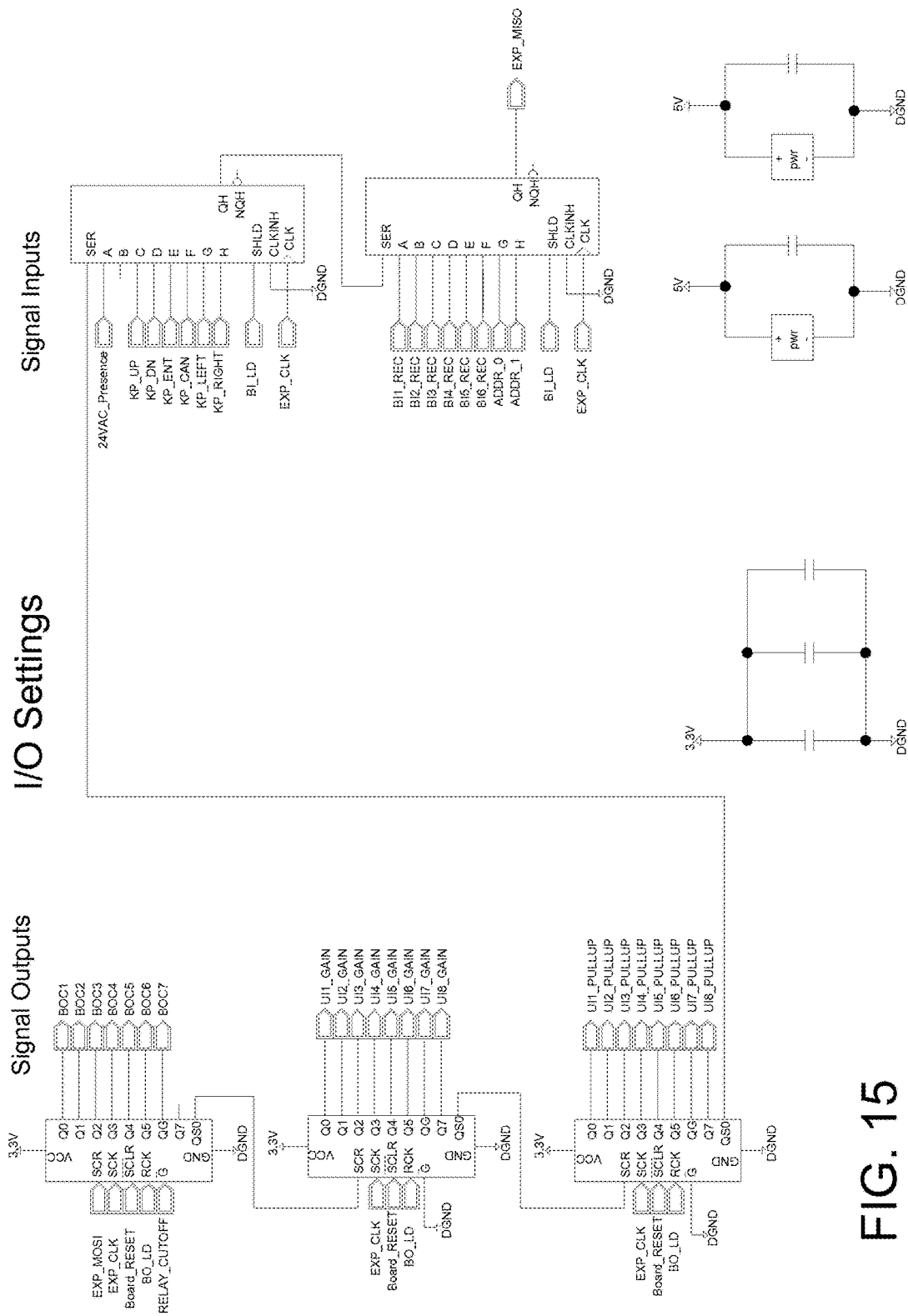
FIG. 15 illustrates an example schematic diagram of an input/output setting interface coupled to the processing circuit of FIG. 7, according to some embodiments.
Figure 16:
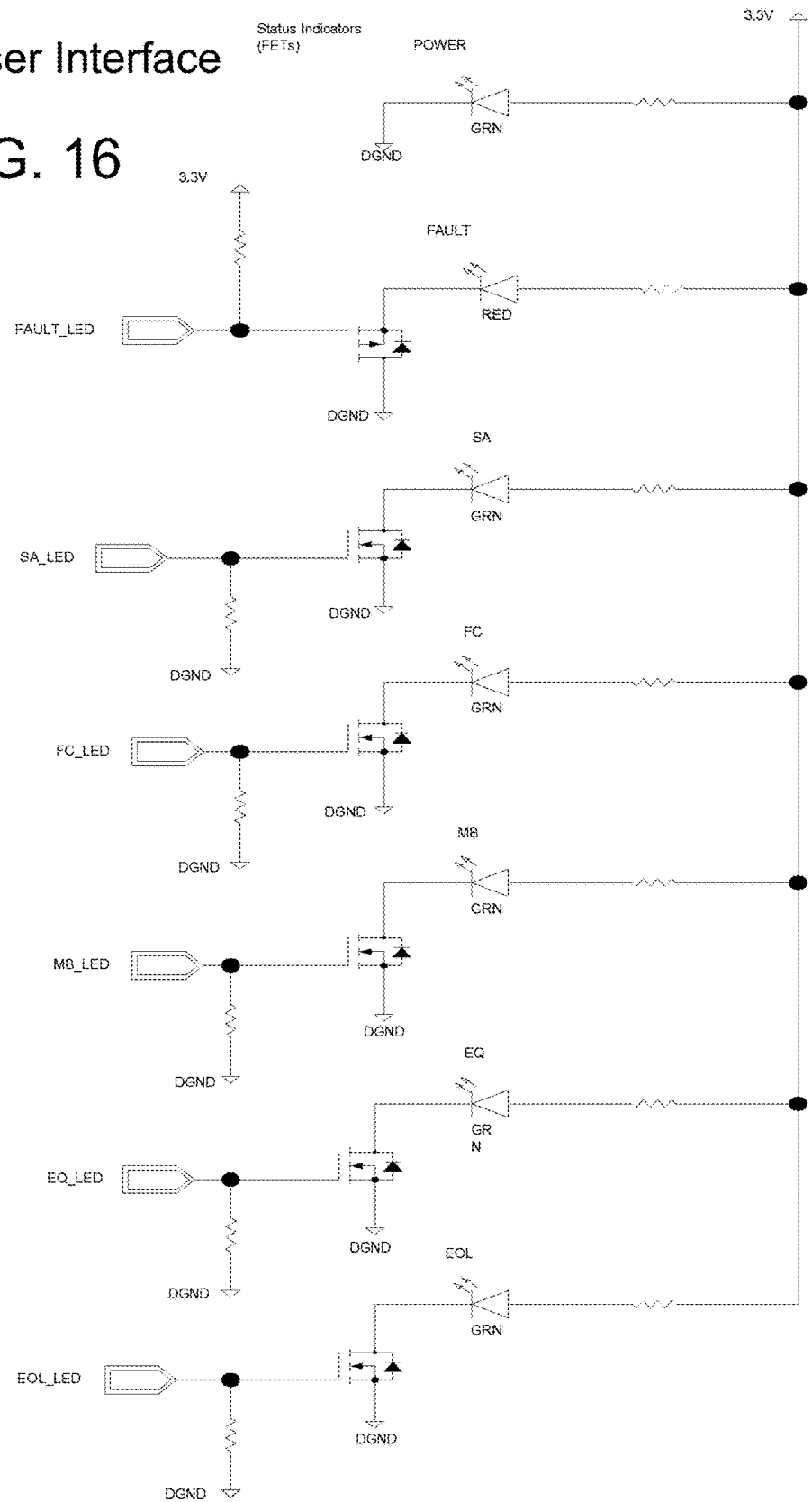
FIG. 16 illustrates an example schematic diagram of a user interface coupled to the processing circuit of FIG. 7, according to some embodiments.
Figure 17:
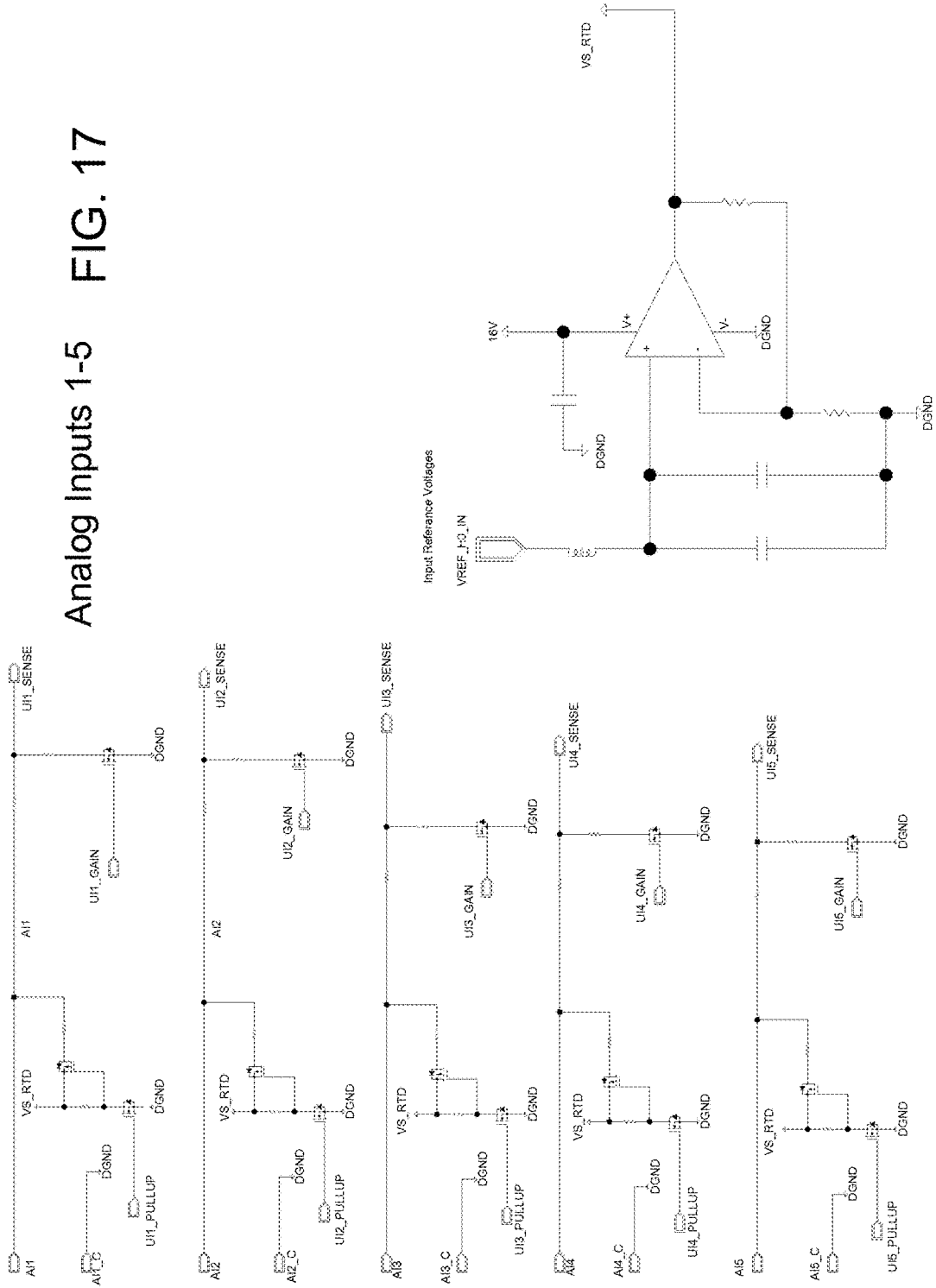
FIG. 17 illustrates an example schematic diagram of an analog input interface coupled to the processing circuit of FIG. 7, according to some embodiments.
Figure 19:
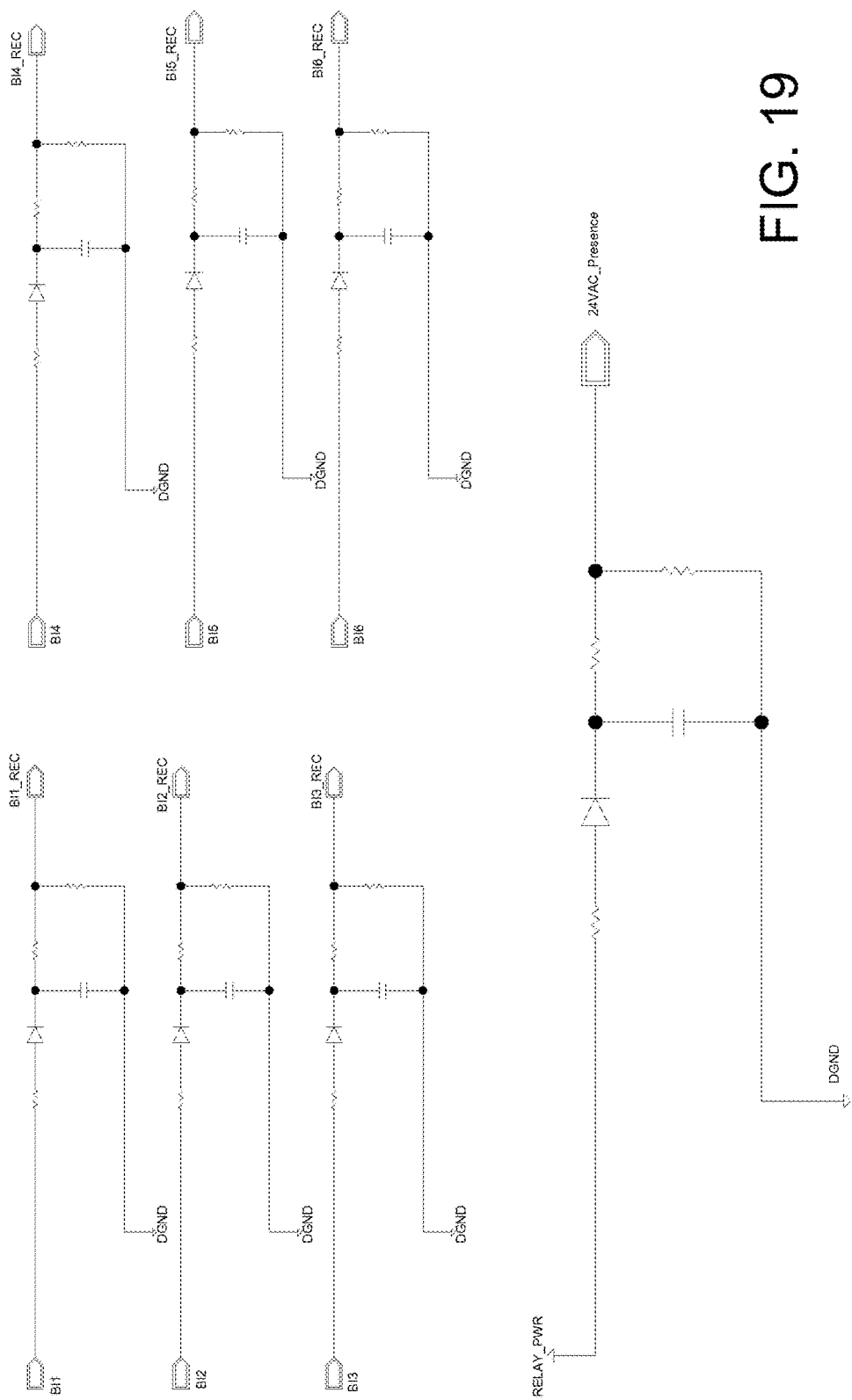
FIG. 19 illustrates an example schematic diagram of a binary input interface coupled to the processing circuit of FIG. 7, according to some embodiments.
Figure 20:
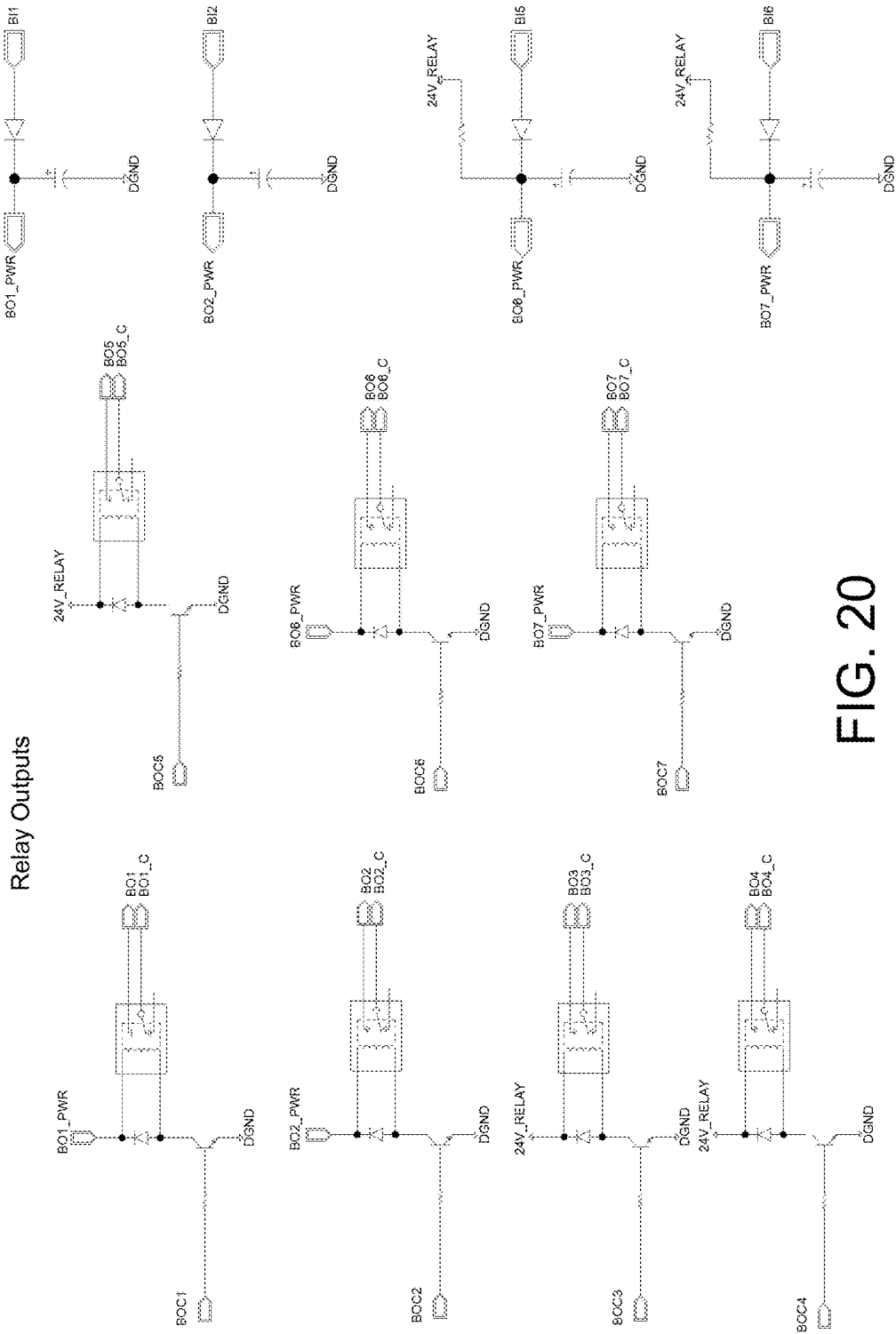
FIG. 20 illustrates an example schematic diagram of a binary output interface coupled to the processing circuit of FIG. 7, according to some embodiments.
Figure 21:
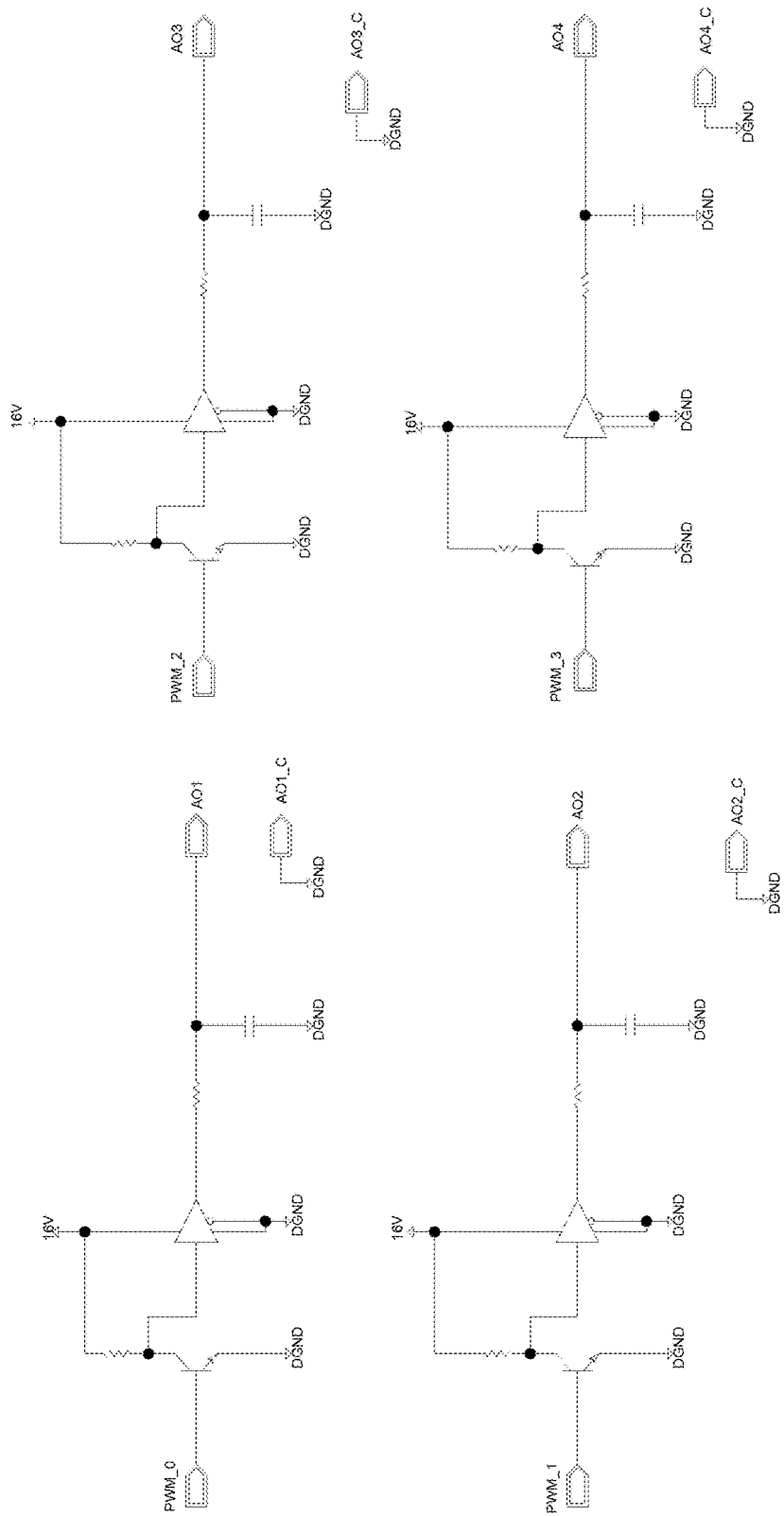
FIG. 21 illustrates an example schematic diagram of an analog output interface coupled to the processing circuit of FIG. 7, according to some embodiments.
Figure 22:
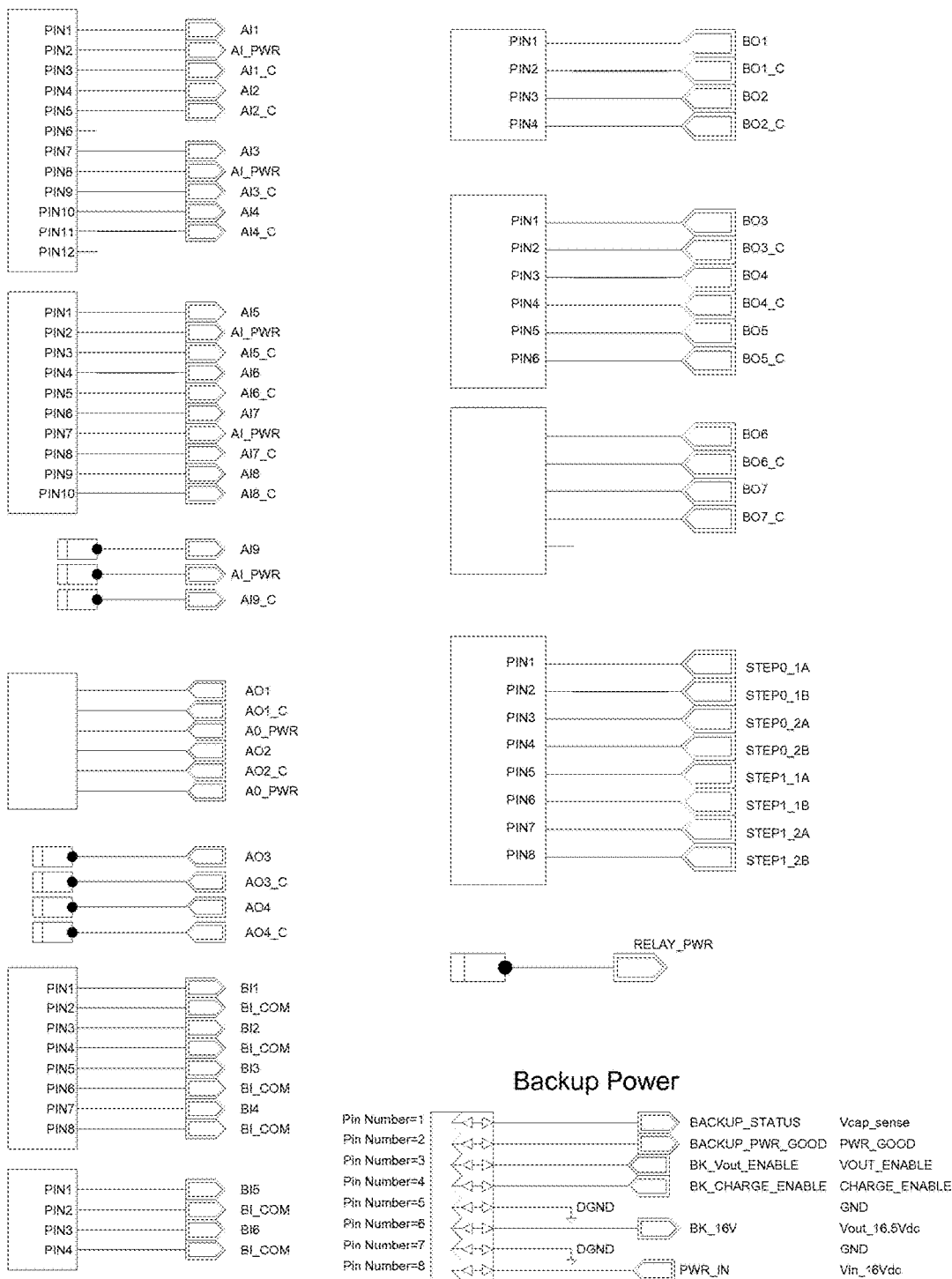
FIG. 22 illustrates an example schematic diagram of various connection interfaces coupled to the processing circuit of FIG. 7, according to some embodiments.

FIGS. 7 through 22 illustrate example schematic diagrams of various components of the valve controller 420 of FIG. 4, according to some embodiments. Specifically, FIG. 7 shows an example schematic diagram of a processing circuit 428 of FIG. 4, according to some embodiments. FIG. 8 shows an example schematic diagram of the motor controller 450 of FIG. 4, according to some embodiments. FIG. 9 shows an example schematic diagram of a power supply for supplying power to the processing circuit of FIG. 7 and the motor controller of FIG. 8, according to some embodiments. FIG. 10 shows an example schematic diagram of storage components coupled to the processing circuit of FIG. 7, according to some embodiments. FIG. 11 shows an example schematic diagram of peripheral components coupled to the processing circuit of FIG. 7, according to some embodiments. FIG. 12 illustrates an example schematic diagram of a USB interface coupled to the processing circuit of FIG. 7, according to some embodiments. FIG. 13 illustrates an example schematic diagram of a communication interface coupled to the processing circuit of FIG. 7, according to some embodiments. FIG. 14 illustrates an example schematic diagram of another communication interface coupled to the processing circuit of FIG. 7, according to some embodiments. FIG. 15 illustrates an example schematic diagram of an input/output setting interface coupled to the processing circuit of FIG. 7, according to some embodiments. FIG. 16 illustrates an example schematic diagram of a user interface coupled to the processing circuit of FIG. 7, according to some embodiments. FIG. 17 illustrates an example schematic diagram of an analog input interface coupled to the processing circuit of FIG. 7, according to some embodiments. FIG. 18 illustrates an example schematic diagram of an additional analog input interface coupled to the processing circuit of FIG. 7, according to some embodiments. FIG. 19 illustrates an example schematic diagram of a binary input interface coupled to the processing circuit of FIG. 7, according to some embodiments. FIG. 20 illustrates an example schematic diagram of a binary output interface coupled to the processing circuit of FIG. 7, according to some embodiments. FIG. 21 illustrates an example schematic diagram of an analog output interface coupled to the processing circuit of FIG. 7, according to some embodiments. FIG. 22 illustrates an example schematic diagram of various connection interfaces coupled to the processing circuit of FIG. 7, according to some embodiments.

As shown in FIG. 7, the processing circuit may be implemented as a microprocessor. The microprocessor outputs a PWM signal indicating a target current level corresponding to a selected operating mode of a valve. In one example, the microprocessor outputs the PWM signal through a PWM_8 port, according to the target current level. Referring to FIG. 8, illustrated are an R-C filter (810 and 820) operating as an AC/DC converter 520 and a stepper motor controller 830 operating as the motor controller 550 of FIG. 5. The R-C filter comprising a resistor 810 and a capacitor 820 receives the PWM signal through the PWM_8 port, and converts the PWM signal into a DC reference according to the pulse width of the PWM signal. The stepper motor controller 830 receives the DC reference from the R-C filter, and supplies a drive current at the target current level to the motor through the step0_1A, step0_1B, step0_1C, step0_2A, step0_2B ports. In addition, the stepper motor controller 830 receives the sense current through sense1, sense2 ports for feedback control.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system to operate a valve including a direct current (DC) stepper motor, comprising:
    a valve detector to identify the valve and determine whether the valve is operable in multiple operating modes;
    a mode selector electrically coupled to the valve detector, the mode selector to select an operating mode from the multiple operating modes;
    a current selector electrically coupled to the mode selector, the current selector to select a target current level based on the selected operating mode; and a motor controller electrically coupled between the current selector and the DC stepper motor, the motor controller to drive the DC stepper motor with a drive current at the selected target current level.

2. The system of claim 1, wherein the valve is an electronic expansion valve.

3. The system of claim 1, wherein the multiple operating modes comprise a hold drive mode, a slow drive mode, and a fast drive mode.

4. The system of claim 3, wherein the DC stepper motor operating in the hold drive mode consumes less power than the DC stepper motor operating in the slow drive mode and the fast drive mode, and wherein the DC stepper motor operating in the slow drive mode consumes less power than the DC stepper motor operating in the fast drive mode.

5. The system of claim 4, comprising:
the mode selector configured to select the fast drive mode as the selected operating mode in response to a determination that the valve is not operable in the multiple operating modes.

6. The system of claim 4, comprising:
a power detector electrically coupled to the DC stepper motor, the power detector to determine that the DC stepper motor is running on backup power, the mode selector configured to select the slow drive mode as the selected operating mode in response to a determination that the DC stepper motor is running on the backup power.

7. The system of claim 1, wherein the current selector is configured to select the target current level based on the identified valve and the selected operating mode through a look up table.

8. The system of claim 1, comprising:
a pulse width modulation controller electrically coupled to the current selector, the pulse width modulation controller to generate a pulse width modulated signal based on the selected target current level; and
a converter electrically coupled to the pulse width modulation controller, the converter configured to generate a reference signal based on the pulse width modulated signal.

9. The system of claim 8, wherein the motor controller comprises:
a current sensor electrically coupled to the DC stepper motor, the current sensor to generate a sense signal corresponding to a current consumed by the DC stepper motor;
a comparator electrically coupled to the converter and the current sensor, the converter to:
receive the reference signal and the sense signal,
compare the reference signal and the sense signal, and
generate a motor control signal based on the comparison; and
a motor driver electrically coupled between the comparator and the DC stepper motor, the motor driver configured to modulate the drive current provided to the DC stepper motor according to the motor control signal, the comparator to generate the motor control signal to adjust the drive current to be within a threshold current range with respect to the selected target current level.

10. A method for operating a valve including a direct current (DC) stepper motor, the method comprising:
identifying the valve;
determining whether the valve is operable in multiple operating modes, wherein the multiple operating modes comprise a hold drive mode, a slow drive mode, and a fast drive mode, wherein the DC stepper motor operating in the hold drive mode consumes less power than the DC stepper motor operating in the slow drive mode and the fast drive mode, and wherein the DC stepper motor operating in the slow drive mode consumes less power than the DC stepper motor operating in the fast drive mode;
selecting an operating mode from the multiple operating modes;
selecting a target current level based at least partially on the selected operating mode; and
driving the DC stepper motor with a drive current at the selected target current level, thereby causing the DC stepper motor to operate in the selected operating mode.

11. The method of claim 10, wherein the valve is an electronic expansion valve.

12. The method of claim 10, comprising:
selecting the fast drive mode in response to a determination that the valve is not operable in the multiple operating modes.

13. The method of claim 10, comprising:
determining that the DC stepper motor is running on backup power; and
selecting the slow drive mode to be the operating mode in response to a determination that the DC stepper motor is running on the backup power.

14. A method for operating a valve including a direct current (DC) stepper motor, the method comprising:
identifying the valve;
determining whether the valve is operable in multiple operating modes;
selecting an operating mode from the multiple operating modes;
selecting a target current level based at least partially on the selected operating mode, wherein the target current level is selected based on the identified valve and the selected operating mode through a look up table; and
driving the DC stepper motor with a drive current at the selected target current level, thereby causing the DC stepper motor to operate in the selected operating mode.

15. The method of claim 14, comprising:
generating a pulse width modulated signal according to the selected target current level, a pulse width of the pulse width modulated signal corresponding to the selected target current level; and
generating a reference signal based on the pulse width modulated signal.

16. The method of claim 15, comprising:
obtaining a sense signal corresponding to a current consumed by the DC stepper motor;
comparing the reference signal and the sense signal;
generating a motor control signal based on the comparison; and
modulating the drive current provided to the DC stepper motor according to the motor control signal to adjust the drive current to be within a threshold current range with respect to the selected target current level.

17. A system to operate a valve including a motor, the system comprising:
a mode selector to select an operating mode from multiple operating modes based on characteristics of the valve;
a current selector electrically coupled to the mode selector, the current selector to select a target current level based on the selected operating mode; and a motor controller electrically coupled between the current selector and the motor, the motor controller to drive the motor with a drive current at the selected target current level.

18. The system of claim 17, comprising:
the mode selector configured to select the operating mode based on at least one of: a power source of the motor, a response time of the valve, and a state of the valve.

* * * * *